United States Patent [19]
Sakamoto et al.

[11] Patent Number: 5,221,970
[45] Date of Patent: Jun. 22, 1993

[54] FACSIMILE SYSTEM INCLUDING A CARD MOUNTING PORTION

[75] Inventors: Takahiro Sakamoto, Tokyo; Takeshi Ikeda, Yokohama, both of Japan

[73] Assignee: Canon Kabushiki Kaisha, Tokyo, Japan

[21] Appl. No.: 634,471

[22] Filed: Dec. 27, 1990

[30] Foreign Application Priority Data

| Dec. 29, 1989 | [JP] | Japan | 1-343121 |
| Dec. 29, 1989 | [JP] | Japan | 1-343130 |
| Jan. 8, 1990 | [JP] | Japan | 2-002344 |
| Jan. 16, 1990 | [JP] | Japan | 2-007767 |
| Jan. 31, 1990 | [JP] | Japan | 2-020727 |
| Feb. 27, 1990 | [JP] | Japan | 2-47842 |
| Apr. 19, 1990 | [JP] | Japan | 2-103369 |

[51] Int. Cl.$^5$ .................................................. H04N 1/40
[52] U.S. Cl. .................................. 358/444; 358/400
[58] Field of Search ............... 358/444, 440, 443, 468, 358/403, 404, 406, 400, 296, 298; 341/22; 340/825.31; 235/380; 379/100; 346/76 PH

[56] References Cited

U.S. PATENT DOCUMENTS

| 4,795,891 | 1/1989 | Morizaki . |
| 4,901,068 | 2/1990 | Benton et al. . |
| 4,943,068 | 7/1990 | Yoshinaga et al. . |
| 5,027,153 | 6/1991 | Komiya . |
| 5,115,273 | 9/1992 | Ujiie et al. . |

*Primary Examiner*—Edward L. Coles, Sr.
*Assistant Examiner*—Kim Y. Vu
*Attorney, Agent, or Firm*—Fitzpatrick, Cella, Harper & Scinto

[57] ABSTRACT

A facsimile system comprises a mounting portion which can receive a data memory card having data input keys in such a way that the card may be freely detachable. Therein, the card mounting portion makes the card visible so that the keys can be operated, and uses a positioning means to position the loaded card. Thus, close contact between the data memory card and the main unit is upgraded to ensure high precision in sending or receiving signals between them.

9 Claims, 26 Drawing Sheets

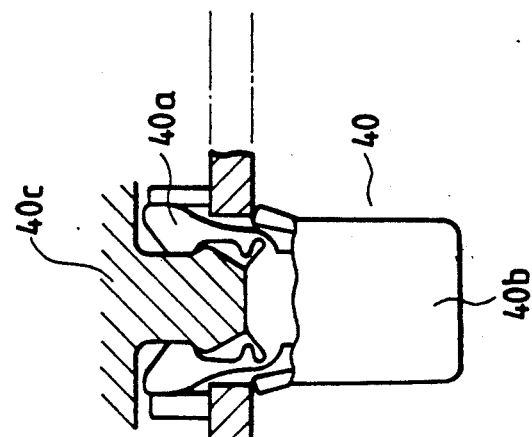
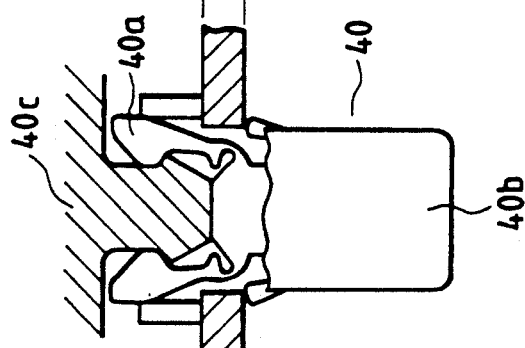
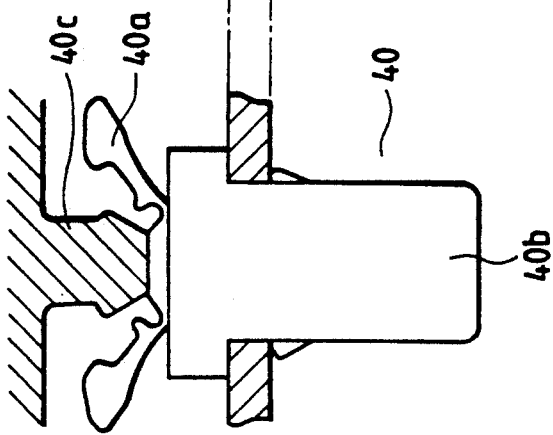
FIG. 30

FACSIMILE SYSTEM INCLUDING A CARD MOUNTING PORTION

BACKGROUND OF THE INVENTION

1. Field of the Invention

The present invention relates to a facsimile system having a card mounting portion which loads an electronic telephone directory card or any other data memory card so that the card will be freely detachable.

2. Related Background Art

Facsimile system has been incorporated with various advanced functions recently and is getting more and more multifunctional. In part of advancing and further diversifying built-in functions, it becomes possible to register receiving stations in abbreviated dial sets. Thus, the number of operation input switches on the operator panel is tend to increase. This increase in the number of switches causes a problem that individual switches are made too compact and thereby the operability is deteriorated.

A new system has been employed (disclosed, for example, in FIG. 1 of U.S. Pat. Application Ser. No. 468,869 filed in Jan. 23, 1990), wherein one operation input switch contains multiple input functions and selects any input function.

With the advent of a multifunctional facsimile system, an IC ROM card has installed to double the functions of a facsimile system. The ROM card is used with its end connected to a connector of the facsimile system to increase memory capacity of a main unit of the facsimile system.

However, if one facsimile system is shared among multiple users, the users sometimes have different receiving stations of facsimile. In the aforesaid prior system, the number of registrable abbreviated dial sets and the memory capacity are limited. Therefore, multiple users cannot register their intended company names in memory of the main unit of a facsimile system.

To solve these problems, in U.S. Pat. Application Ser. No. 539,344 filed on Jun. 18, 1990 has been proposed facsimile system comprising a mounting portion which receives an electronic telephone directory card or any other data memory card having data input keys so that the card will be freely detachable. Therein, the loaded data memory card can be operated externally. In this proposal, the mounting portion for loading a card constitutes a recess 21 in the main unit of the facsimile system and measures the size of the data memory card as shown in FIG. 41. Cards are inserted into the recess 21 from above or sideways. The cards are displaced laterally with springs and then positioned.

A card thus loaded works to communicate data with the main unit of a facsimile system. Information specified with operating keys on the card is sent as optical information from light emitting elements on the back of the card into light receiving elements in the main unit of the facsimile system.

However, in the foregoing facsimile system, a card is placed on the bottom of the recess 21 in the mounting portion and then positioned. Therefore, the card must be allocated not to cause a gap between the card and the bottom of the recess 21. If a gap is created between the card and facsimile system, light emitting elements on the back of the card and light receiving elements in the main unit of the facsimile system are positioned incorrectly. Due to insufficient light or incident external light, the light receiving elements may receive incorrect optical information.

A gap is created between a card and the bottom of a recess 21 of a loader, because the card weights only several grams. Therefore, when the card is positioned askew, the end of the card is galled to the side wall of the concave section 21 of the loader. As a result, the card is not adhered to the bottom of the recess of the loader. To overcome this problem, a card may be made heavier. A card acting as an electronic telephone directory is often put in a purse and carried here and there. It should be compact and light-weight. A heavier card may lead to an increase in costs. Thus, adhesion between the card and the bottom the recess 21 is dependent of the card weight. When an electronic telephone directory card is loaded into the main unit of a facsimile system, it must be placed precisely. This requires a user's attention.

SUMMARY OF THE INVENTION

The object of the present invention is to solve the aforesaid problems, ensuring adhesion between a card acting as an electronic telephone directory and a card mounting portion in the main unit of a facsimile system.

Other object of the invention is to attach a card to a mounting portion of the main unit correctly.

Other object of the invention is to realize a finely-designed appearance of a card mounting portion regardless of whether a card is mounted or not.

Other object of the invention underlies that when a card is positioned in a card mounting portion, a system detects the presence of the card and sets the card at an optimal position.

The other objects of the invention will be apparent in conjunction with embodiments described later.

BRIEF DESCRIPTION OF THE DRAWINGS

FIG. 30 is an explanatory drawing of operations of a push lock shown in FIGS. 28 and 29.

DESCRIPTION OF THE PREFERRED EMBODIMENTS

Figure 1:
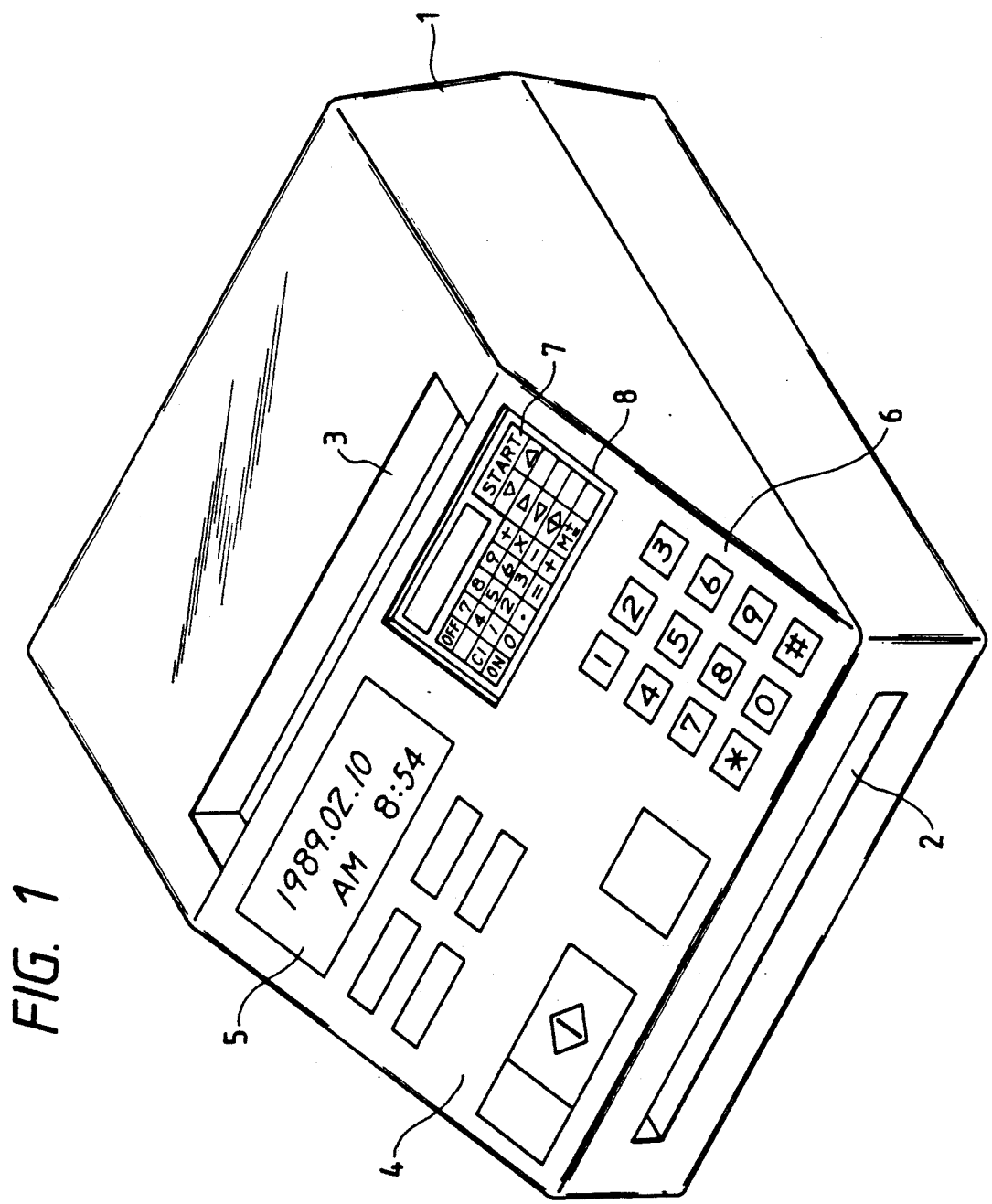
FIG. 1 is a sketch drawing of an entire system implementing a first embodiment of the invention.
Figure 2:
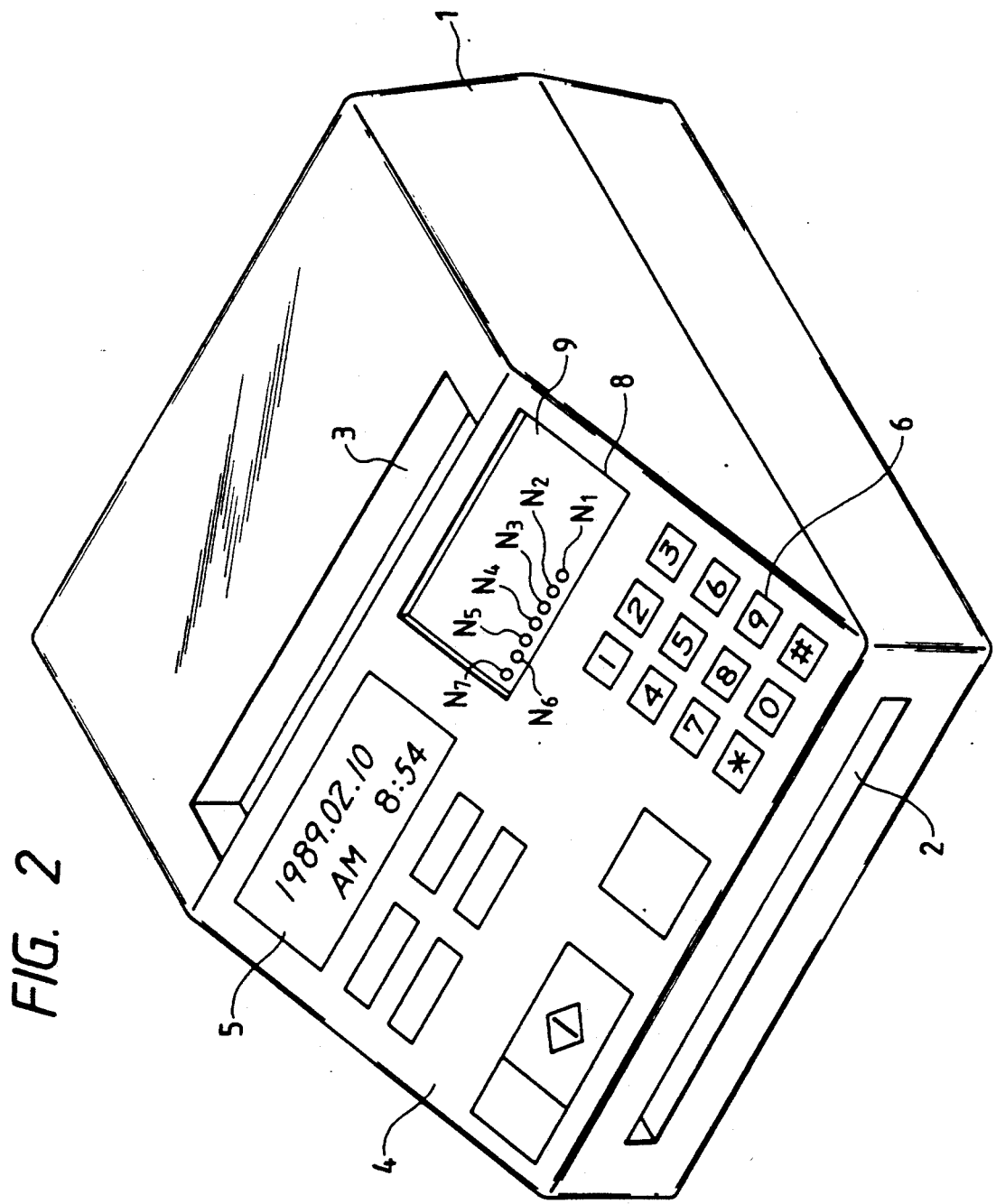
FIG. 2 is a view of the system of FIG. 1 from which a card is taken out.
Figure 3:
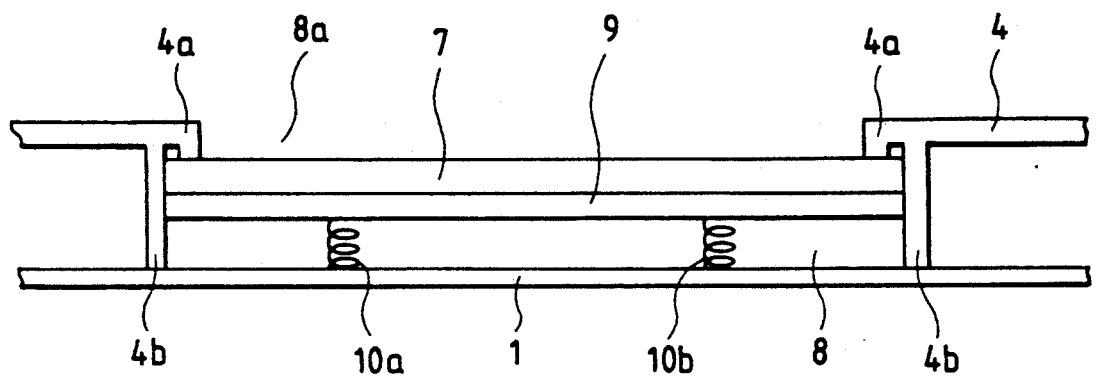
FIG. 3 is a detail drawing of the mounting portion shown in FIG. 1.
Figure 4:
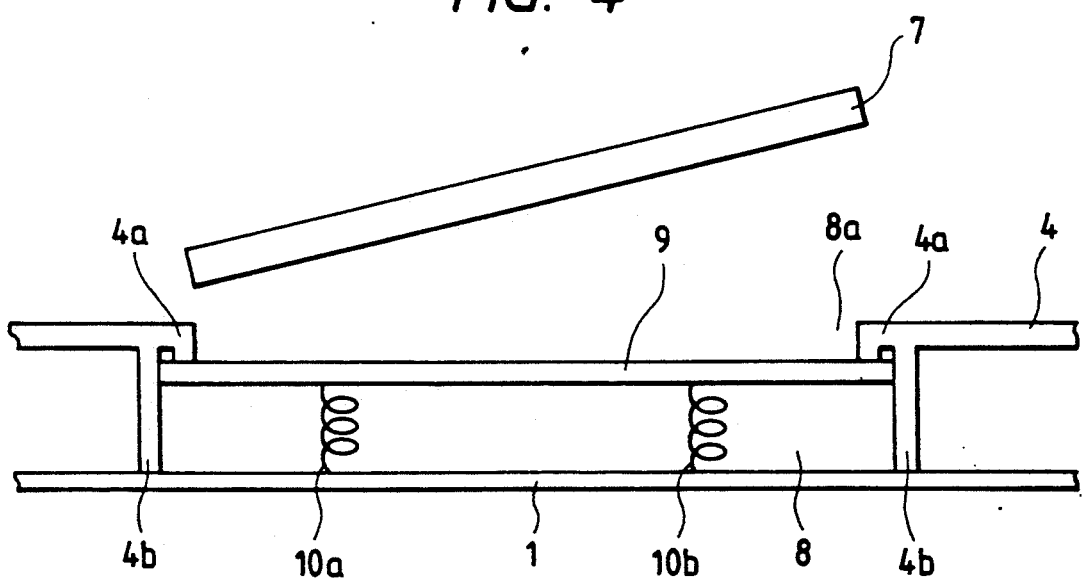
FIG. 4 is a detail drawing of the mounting portion shown in FIG. 2.

The first embodiment of the invention is described below in conjunction with the drawings. FIGS. 1 and 2 show the appearance of a facsimile system having an electronic telephone directory which acts as a data input/output apparatus. 1 represents a main unit, and 2, an original insertion slot. 3 is an outlet of originals and recording sheets and located on the top of the main unit 1. 4 is an operation panel inclining forward from the top of the main unit 1. On the operation panel 4, a display 5, ten-key pad 6, and other various keys are arranged. The operation panel 4 is provided with a mounting portion 8 onto which a data memory card 7 is loaded. The mounting portion 8 includes an opening 8a for attaching and detaching the data memory card 7 and for operating keys on the card 7 externally as shown in FIGS. 3 and 4. The mounting portion 8 has a concave shape. The opening 8a has a size corresponding to the card 7. The length of the opening 8a is slightly shorter than that of the card 7, and the width of the opening 8a, slightly longer than that of the card 7. This is intended to lock the card 7 loaded form the opening 8a. In the mounting portion 8, an installation plate 9 on which a card 7 is placed is attached to be freely movable. The installation plate 9 is pressured to a periphery 4 of the opening 8a by means of coil springs 10a and 10b, or pressing members. When a card 7 is loaded, it is clamped between the installation plate 9 and the periphery 4 of the opening 8a due to force of the spring 10a and 10b. 4b represents a side wall of the mounting portion. The installation plate 9 is provided with an array of light receiving elements $N_1$ to $N_7$ as shown in FIG. 2. The light receiving elements are described later.

Figure 5:
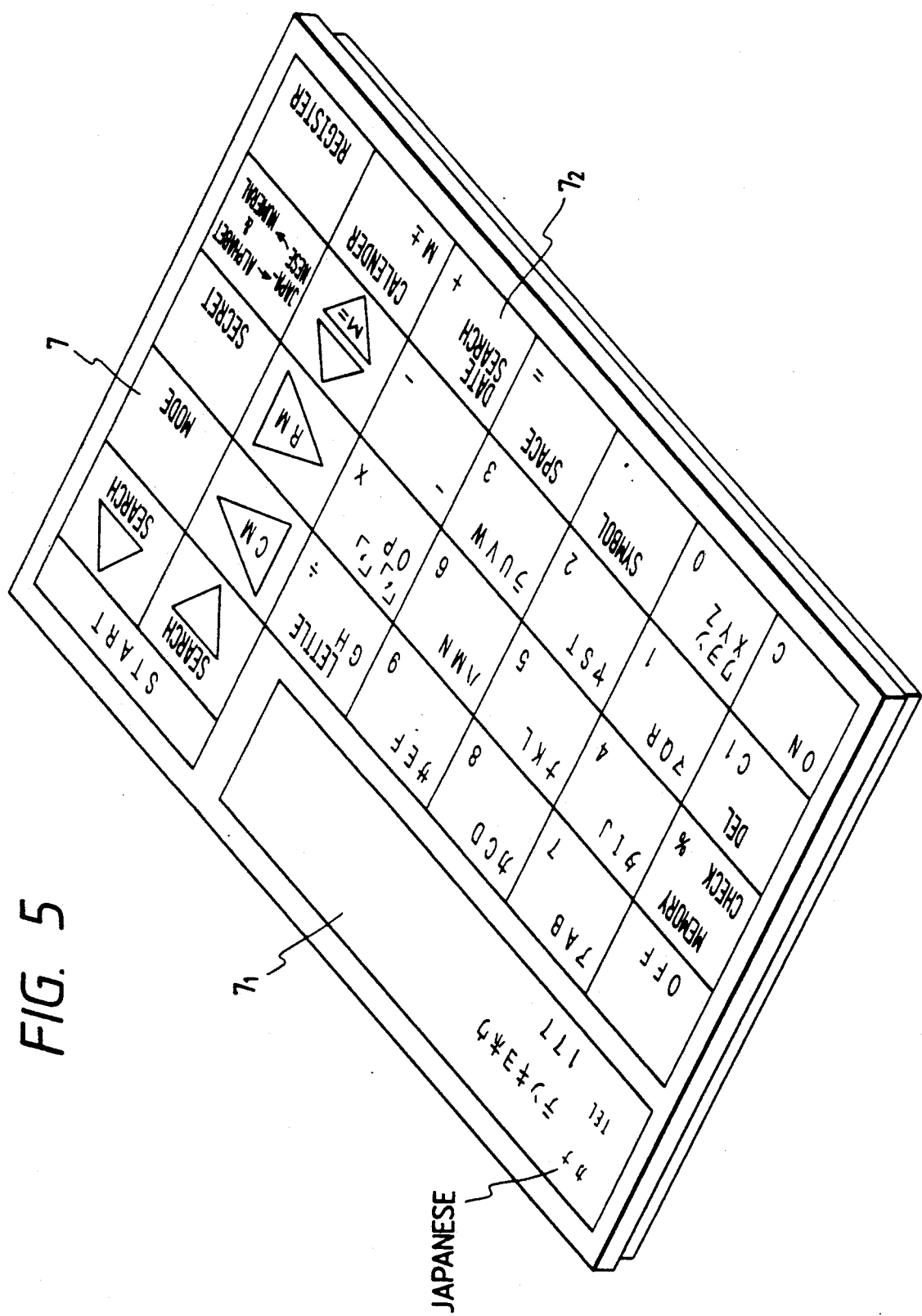
FIG. 5 is a perspective view of a data memory card used for the system in FIG. 1 which is viewed from front.
Figure 6:
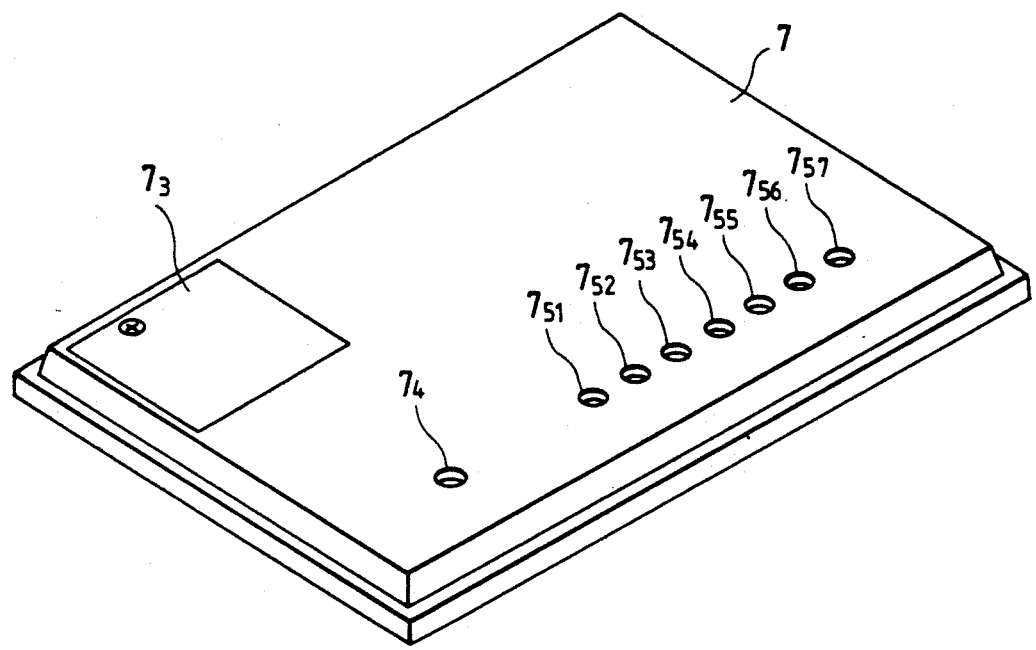
FIG. 6 is a perspective view of the data memory card shown in FIG. 5 which is viewed from back.
Figure 7:
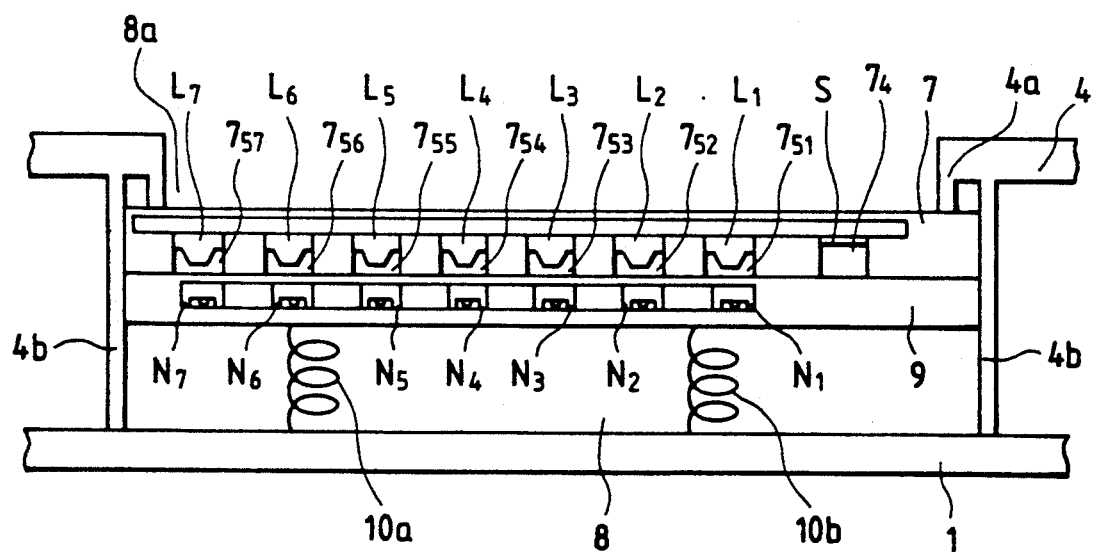
FIG. 7 is a cross-section of the mounting portion showing the relation between the light receiving and light emitting units shown in FIG. 1.

On the front of the data memory card 7, a display $7_1$ data keys $7_2$ are arranged as shown in FIG. 5. The data keys $7_2$ identified functions of a telephone directory, or data items contained in the card 7. The display $7_1$ displays a data item identified. On the back of the card 7, a battery cover $7_3$, RESET switch window $7_4$, and LED windows $7_{51}$ to $7_{57}$ are arranged as shown in FIG. 6. The battery cover $7_3$ is fixed to the card 7 with screws, wherein a lithium battery is accommodated. When the center of the RESET switch window $7_4$ is pressed with a pin, a RESET switch S within the card 7 is actuated to clear various data items stored in memory. The LED windows $7_{5.1}$ to $7_{5.7}$ transmit light beams of light emitting diodes $L_1$, $L_2$, $L_3$, $L_4$, $L_5$, $L_6$, and $L_7$. The light emitting diodes $L_1$ to $L_7$ are opposed to seven light receiving elements $N_1$, $N_2$, $N_3$, $N_4$, $N_5$, $N_6$, and $N_7$ as shown in FIG. 7. Depending on the light receiving results of these light receiving elements $N_1$ to $N_7$, data items selected with keys on the card 7 are entered into the main unit of the facsimile system.

Next, the operations of a facsimile system having the aforesaid configuration are described.

A card 7 is held in such a way that LED windows $7_{51}$ to $7_{57}$ on the back of the card 7 may coincide with light receiving elements $N_1$ to $N_7$ in a facsimile system. The card 7 is inclined and with one end of the card 7, an installation plate 9 is pressed against force of springs 10a and 10b through the opening 8a of the mounting portion 8. Thus, one end of the card 7 is clamped between the periphery 4a of the opening 8a and the installation plate 9. With another end of the card 7, the installation plate 9 is also pressed against force of the springs 10a and 10b. Thus, another end of the card 7 is clamped between the periphery 4a of the opening 8a and the installation plate 9. Then, when the card 7 is released, the card 7 is pressed by the installation plate 9 due to force of the coil springs 10a and 10b and clamped between the installation plate 9 and the periphery 4a of the opening 8a.

Thus, every time a card 7 is loaded at a given position, it is aligned so that light emitting diodes $L_1$ to $L_7$ and light receiving elements $N_1$ to $N_7$ are properly located one another and communication is made correctly.

Keys $7_2$ on a card 7 are visible to an operator via an opening 8a. The operator presses intended keys $7_2$ of the card 7 with his/her finger. Thereby, information specified with the keys $7_2$ on the card 7 is sent as light information from light emitting diodes $L_1$ to $L_7$ to light receiving elements in the main unit of a facsimile system.

To remove the card 7 from the mounting portion 8, while the card 7 is being pressed against spring force of springs 10a and 10b, another end of the card 7 is released from clamp between the periphery 4a of the opening 8a and the installation plate 9. Then one end is released from clamp between the periphery 4a of the opening 8a and the installation plate 9. Thus, the card 7 can be removed from the mounting chamber 8.

In the aforesaid embodiment, the opening periphery 4a in the mounting portion is in an extension of the operation panel 4. The present invention is not limited to this structure. Other member may be installed on the opening periphery in the loader so that it will be pressed by the card 7.

In the aforesaid embodiment, an electronic telephone directory card capable of data transfer is used as a data memory card. Any control card can be used as far as it can transfer data and control communication.

As mentioned previously, according to the first embodiment of the invention, a facsimile system comprises a mounting portion in which a data memory card having data input keys is loaded so that the card may be freely detachable, a movable installation plate being installed in the mounting portion, and a pressing means for pressing the installation plate which attached onto the periphery of an opening in the mounting portion. When the card is loaded in the mounting portion, the card is clamped between the periphery of the opening in the mounting portion and the installation plate. Thereby, even if a card is loaded on the mounting portion carelessly, it can be mounted onto the installation plate in close contact therewith. Therefore, a light receiving unit and a light emitting unit can be made in close contact with each other. This prevents creation of a gap between the light receiving and emitting units, thus eliminating a data transfer failure due to insufficient light, or incorrect data transfer due to incident external light. Consequently, data can be transferred accurately.

The second embodiment of the invention is described below in conjunction with FIGS. 9 to 13. FIGS. 1, 2, 5, 6, and 8 showing the first embodiment are also used. The same components are assigned the same symbols or reference numerals and their specific description is omitted.

Figure 9:
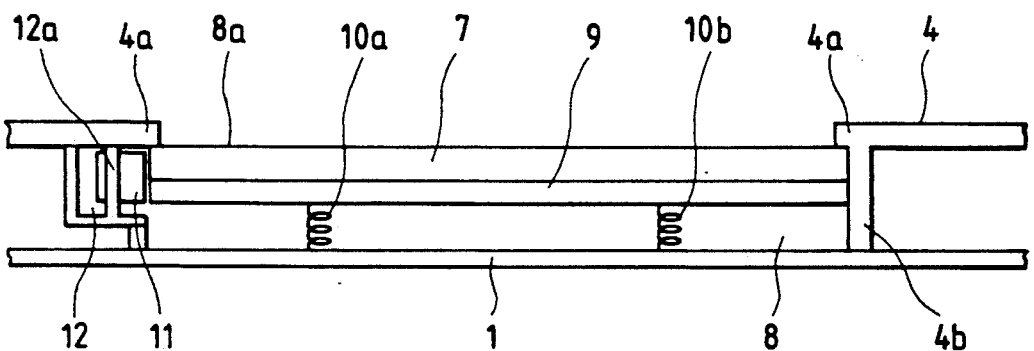
FIG. 9 is a detail drawing of a mounting portion shown in FIG. 1 which is associated with a second embodiment of the invention.
Figure 10:
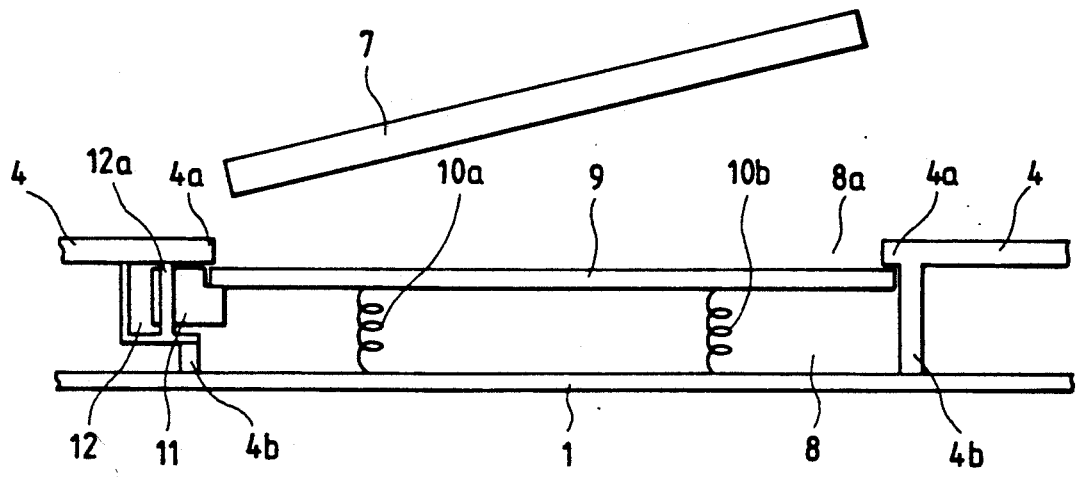
FIG. 10 is a view of the mounting portion shown in FIG. 9 from which a card has been removed.
Figure 11:
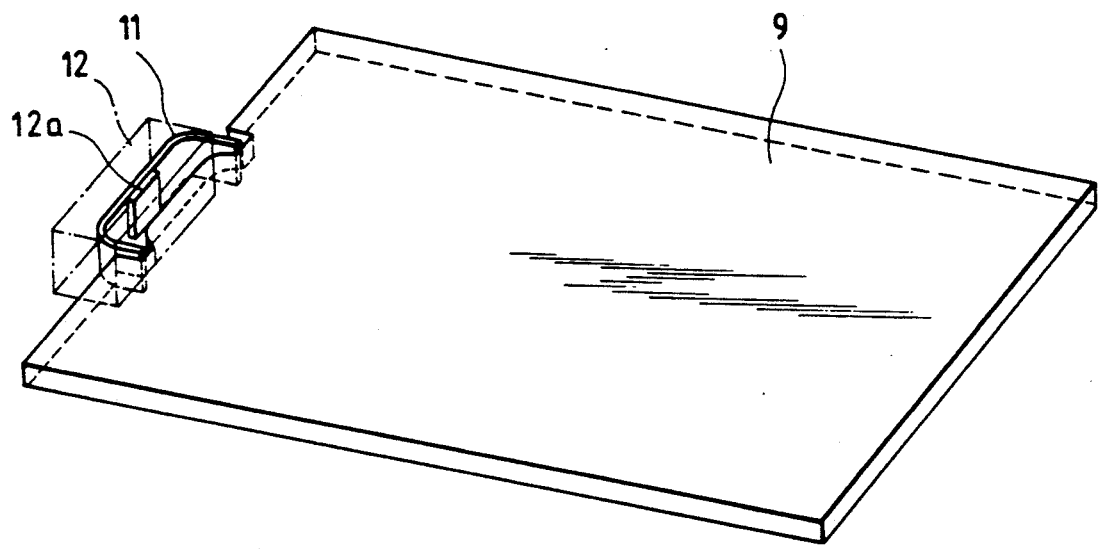
FIG. 11 is an explanatory drawing showing the relation between the installation plate and plate spring shown in FIG. 9.
Figure 12:
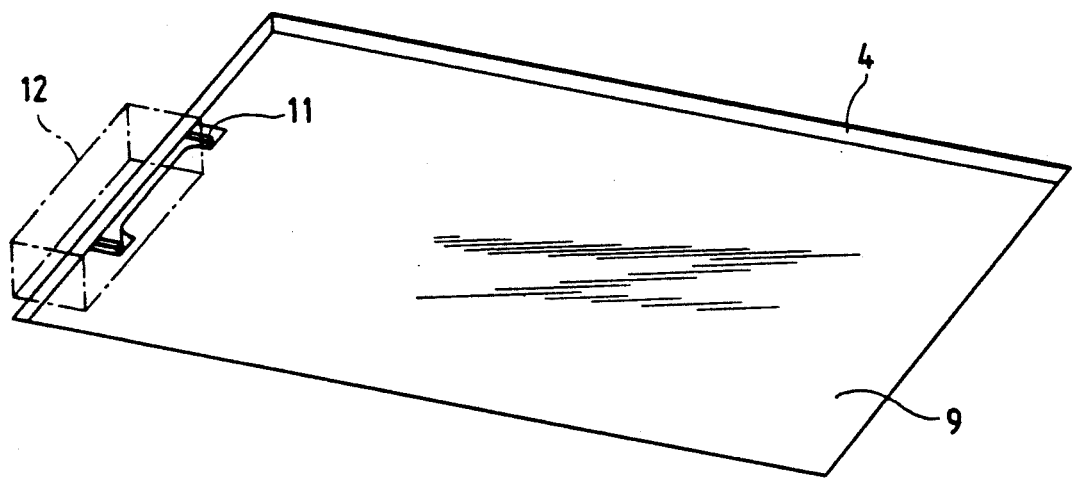
FIG. 12 is a perspective view of the plate spring in FIG. 10 which is viewed from above.
Figure 13:
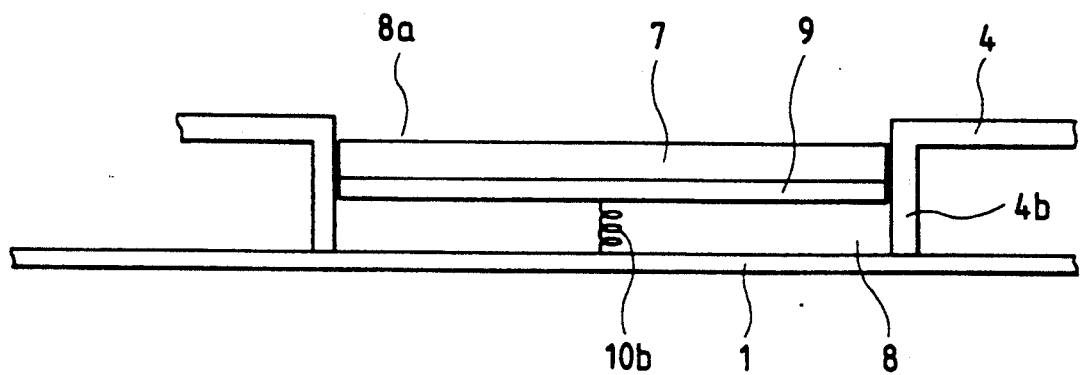
FIG. 13 is a lateral view of the mounting portion shown in FIG. 9 which is viewed from another side.

In a card mounting portion 8, an installation plate 9 on which a card 7 is placed is provided to be movable vertically as shown in FIGS. 9 and 10. The installation plate 9 is pressed to the periphery 4a of an opening 8a by means of a first pressing member, or coil springs 10a and 10b. The mounting portion on the side of the installation plate 9 is provided with a plate spring 11 or a second pressing member as shown in FIGS. 11 and 12.

The plate spring 11 is installed in a plate spring storage chamber 12 of the mounting portion 8, and attached to an attachment member 12a in the storage chamber 12. The inner periphery of the mounting portion constitutes a side wall 4b. On the side of the length of the installation plate 9, a periphery 4a for locking the card is protruded. On the width side, the periphery 4a is not protruded as shown in FIG. 7. When a card 7 is loaded, it is pressed by force of the springs 10a and 10b and clamped between the installation plate 9 and the periphery 4a of the opening 8a. With the coil springs 10a and 10b or the first pressing member, vertical positioning of the card is made. One side end of the card 7 is pressed by force of the flat spring 11 or the second pressing member. Thereby, another side end of the card is pushed toward a side wall. With the plate spring 11 or the second pressing member, lateral positioning of the card is made. The installation plate 9 has an array of light receiving elements as shown in FIG. 2.

Next, the operation of the system having the above configuration is described.

A card 7 is held in such a way that LED windows $7_{5.1}$ to to $7_{5.7}$ on the back of the card 7 will coincide with light receiving elements $N_1$ to $N_7$ in the system. The card 7 is inclined. With one end of the card 7, the installation plate 9 is pressed against force of springs 10a and 10b through the opening 8a of the mounting portion, so that one end of the card 7 may be clamped between the periphery 4a of the opening 8a and the installation plate 9. Then, the plate spring 11 or a second pressing member is pressed. With another end of the card 7, the installation plate 9 is also pressed against force of the springs 10a and 10b. Thus, another end of the card 7 is clamped between the periphery 4a of the opening 8a and the installation plate 9. Then, when the card 7 is released, it is aligned to the side wall 4b by means of the plate spring 11 or the second pressing member, pressed by the installation plate 9 due to force of the coil springs 10a and 10b or the first pressing member, and then clamped between the pressing member and the periphery 4a of the opening 8a.

Thereby, vertical positioning of the card 7 is made by the coil springs 10a and 10b or the first pressing member, and lateral positioning by the plate spring 11 or the second pressing member. As a result, light emitting diodes $L_1$ to $L_7$ and light receiving elements $N_1$ to $N_7$ are correctly positioned one another, thus enabling correct communication.

Keys $7_2$ on the card 7 are visible to an operator through an opening 8a. The operator presses intended keys $7_2$ on the card 7 with his/her finger. Thereby, information specified with the keys $7_2$ on the card 7 is sent as optical information from light emitting diodes $L_1$ to $L_7$ to light receiving elements $N_1$ to $N_7$ in the main unit of the facsimile system.

To remove the card 7 from the mounting portion 8, the card 7 is pressed against force of springs 10a and 10b to press the plate spring 11. Then, another end of the card 7 is released from clamp between the periphery 4a of the opening 8a and the installation plate 9. Then, one end of the card 7 is released from clamp between the periphery 4a of the opening 8a and the installation plate 9. Thus, the card 7 can be removed from the mounting portion 8.

As mentioned previously, according to the second embodiment of the invention, a facsimile system comprises a mounting portion which can load a data memory card having data input keys in such a way that the card may be freely detachable, a movable installation plate being installed in the mounting portion, a first pressing means for pressing the installation plate toward the opening of the mounting portion so as to position the card vertically, and a second pressing means for positioning the card laterally. Therefore, even if the card is loaded onto the mounting portion carelessly, the card can be made in close contact with the installation plate. As a result, the light receiving unit and the light emitting unit can be made in close contact each other. This prevents creation of a gap between the light receiving and emitting units, thus eliminating a data transfer failure due to insufficient light or incorrect data transfer due to incident external light. Consequently, data can be transferred correctly.

The third embodiment of the invention is described below in conjunction with FIGS. 14 to 22. FIGS. 1, 2, 5, 6, and 8 showing the first embodiment are also used. The same components are assigned the same symbols or reference numerals, and their specific description is omitted.

Figure 14:
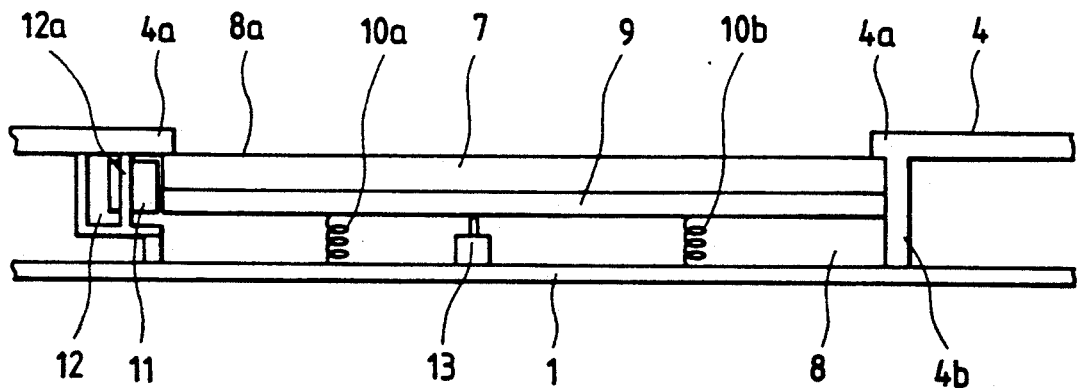
FIG. 14 is a detail drawing of a mounting portion shown in FIG. 1 which is associated with a third embodiment of the invention.
Figure 15:
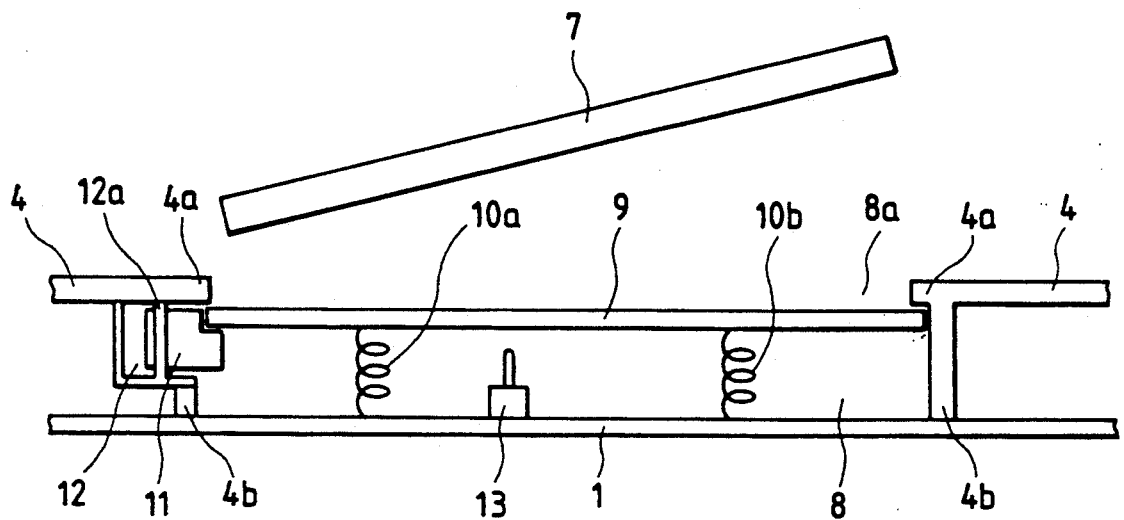
FIG. 15 is a view of the mounting portion in FIG. 14 from which a card has been removed.
Figure 16:
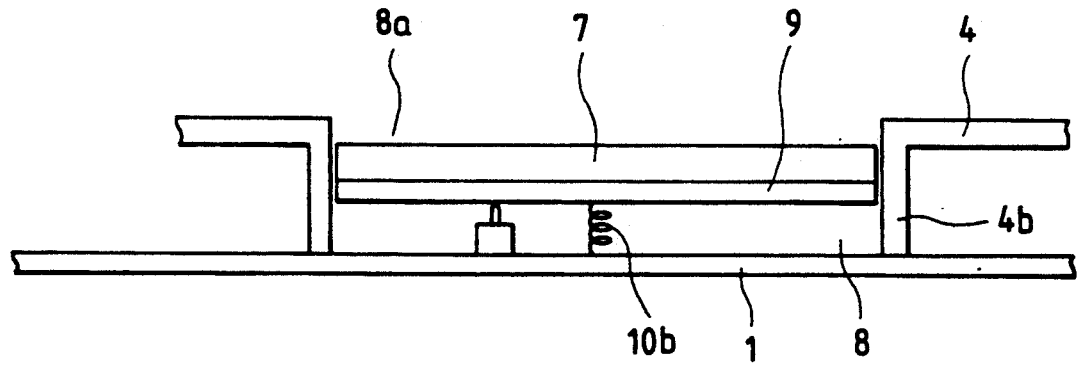
FIG. 16 is a lateral view of the mounting portion shown in FIG. 14 which is viewed from another side.

In a card mounting portion 8, an installation plate 9 on which a card 7 is placed is provided to be vertically movable, as shown in FIGS. 14 and 15. The installation plate 9 is pressed to the periphery 4a of an opening 8a by means of coil springs 10a and 10b or a first pressing member. A card detection switch 13 for detecting vertical movement of the installation plate 9 is installed.

Figure 17:
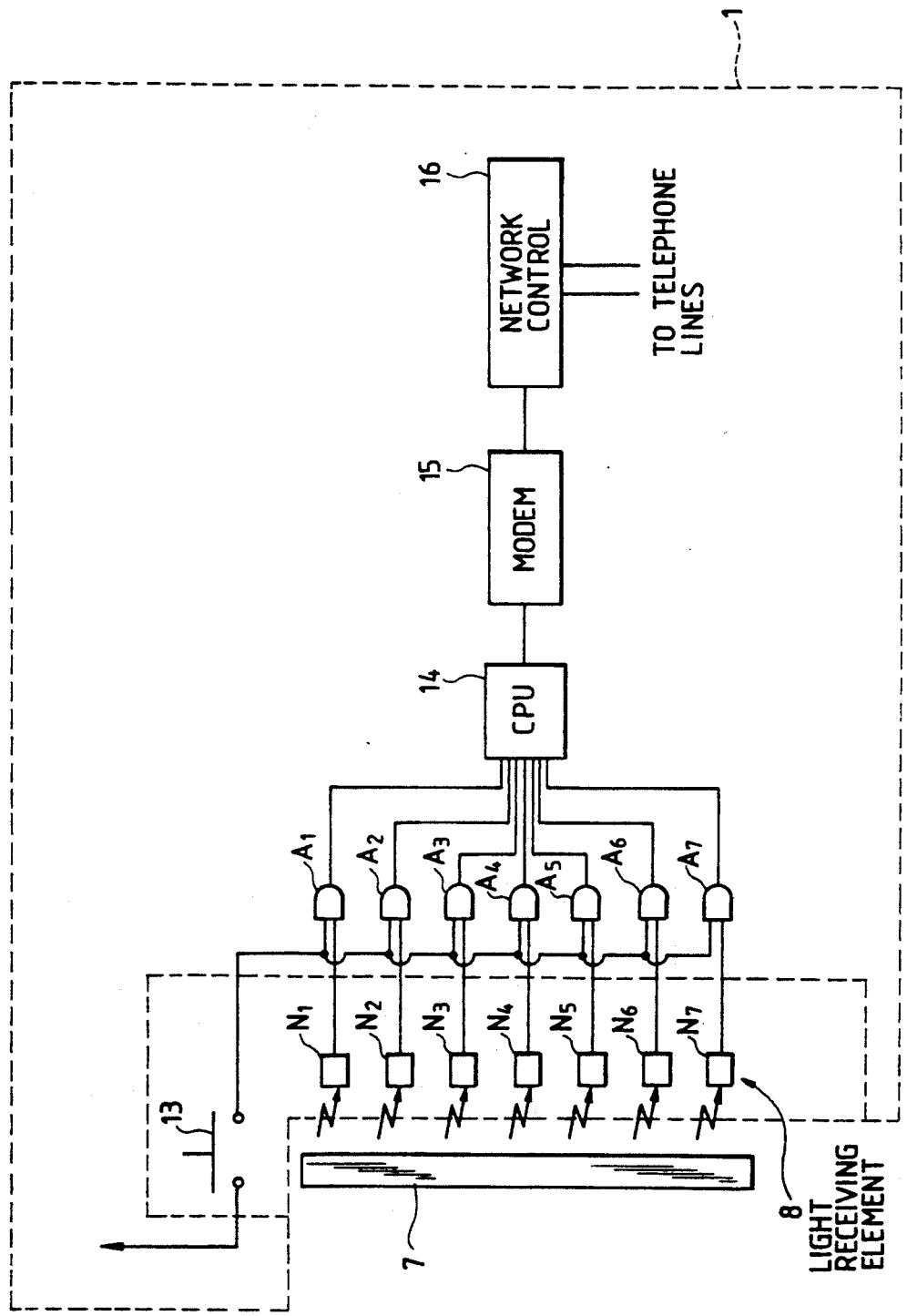
FIG. 17 is a control circuit diagram of a system including the mounting portion shown in FIG. 14.

FIG. 17 shows a control circuit which actuates light receiving elements $N_1$ to $N_7$ acting as a communication means according to the detection switch 13. The detection switch 13 and light receiving elements $N_1$ to $N_7$ are installed in the mounting portion 8. $A_1$ to $A_7$ are AND gates, and 14, a CPU. 15 is a modem, and 16, a network control.

Next, the operation of the system having the above configuration are described.

When a card 7 is loaded in the mounting portion 8, the detection switch 13 is set to ON. It is detected that the card 7 has been loaded. A communication means in the main unit is driven active. That is to say, with the switch 13 ON, light receiving elements $N_1$ to $N_7$ detect light emission of light emitting elements $L_1$ to $L_7$ in the card 7. Then, outputs of the light receiving elements which have detected light are applied to the CPU 14 via AND gates. The CPU 14 activates a network control 16 via the modem 15.

Thus, when the card 7 is loaded in the mounting portion 8, the CPU can receive signals sent from light receiving elements.

When the detection switch 15 is OFF, the communication means in the main unit is not active. Therefore, when a card 7 is not loaded in the mounting portion 8, even if external light enters the light receiving elements in the main unit, the system will not operate incorrectly.

In a facsimile system having a card mounting portion, only when a card 7 is loaded, light receiving elements are made active and enabled to receive signals.

Next, the state in which a communication means is actuated with a card 7 loaded in the mounting portion 8 is described specifically.

A card 7 is held in such a way that LED windows $7_{5.1}$ to $7_{5.7}$ on the back of the card 7 will coincide with light receiving elements $N_1$ to $N_7$ in the system. The card 7 is inclined. With one end of the card 7, the installation plate 9 is pressed against force of springs 10a and 10b through the opening 8a in the mounting portion 8. When one end of the card 7 is clamped between the periphery 4a of the opening 8a and the installation plate 9, the plate spring 11 or the second pressing member is pressed. With another end of the card 7, the installation plate 9 is pressed against force of the springs 10a and 10b. Then, another end of the card 7 is clamped between the periphery 4a of the opening 8a and the installation plate 9. Then, when the card 7 is released, it is aligned to the side wall 4b by the plate spring 11 or the second pressing member, and pressed by the installation plate 9 due to force of the coil springs 10a and 10b or the first pressing member. Then, the card 7 is clamped between the installation plate 9 and the periphery 4a of the opening 8a.

Thus, the card 7 is positioned vertically by the coil springs 10a and 10b or the first pressing member, and laterally by the flat spring 11 or the second pressing member. Consequently, light emitting diodes $L_1$ to $L_7$ and light receiving elements $N_1$ to $N_7$ are correctly positioned one another, enabling correct communication.

Keys $7_2$ on a card 7 are visible to an operator through the opening 8a. The operator pressed intended keys $7_2$ on the card 7 with his/her finger. Thereby, information specified with the keys $7_2$ on the card 7 is sent as optical information from light emitting diodes $L_1$ to $L_7$ to light receiving elements $N_1$ to $N_7$ in the main unit of the facsimile system.

To remove the card 7 from the mounting portion 8, the card 7 is pressed against force of springs 10a and 10b. The plate spring 11 is also pressed. Then, another end of the card 7 is released from clamp between the periphery 4a of the opening 8a and the installation plate 9. One end of the card 7 is also released from clamp between the periphery 4a of the opening 8a and the installation plate 9. Thus, the card 7 is removed from the mounting portion 8.

Figure 18:
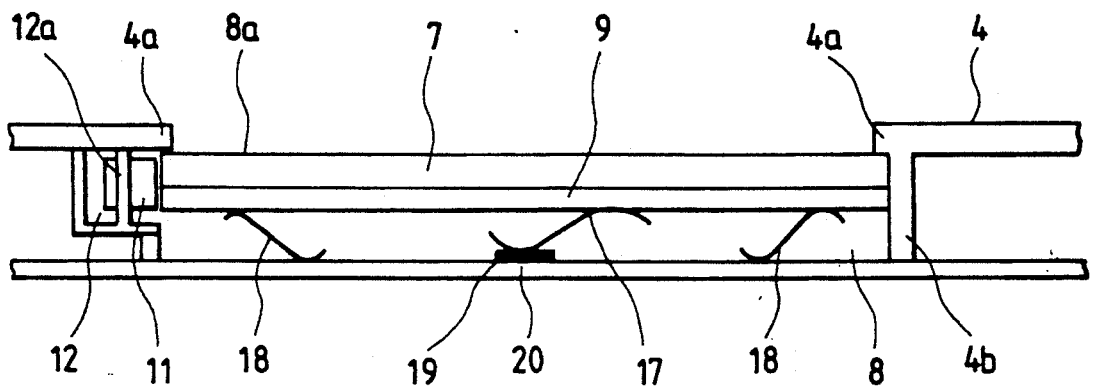
FIG. 18 is a detail drawing of a first modification of the mounting portion shown in FIG. 14.

As shown in FIG. 18, if the first pressing member is made of phosphor bronze for springs or other material having flexibility and conductivity, a card detector may be eliminated. Specifically, a flexible member (1) 17 with conductivity and a flexible member (2) 18 are installed in the installation plate 9, and a comb-tooth type pattern 19 is attached to a flexible member contact region on a PC board 20. With the above configuration, when a card 7 is loaded in the mounting portion 8 of a main unit 1, the flexible member (1) 17 installed on the lower plane of the installation plate 9 touches the comb-tooth type pattern 19, bends, and then causes the comb-tooth type pattern 19 to conduct.

Figure 19:
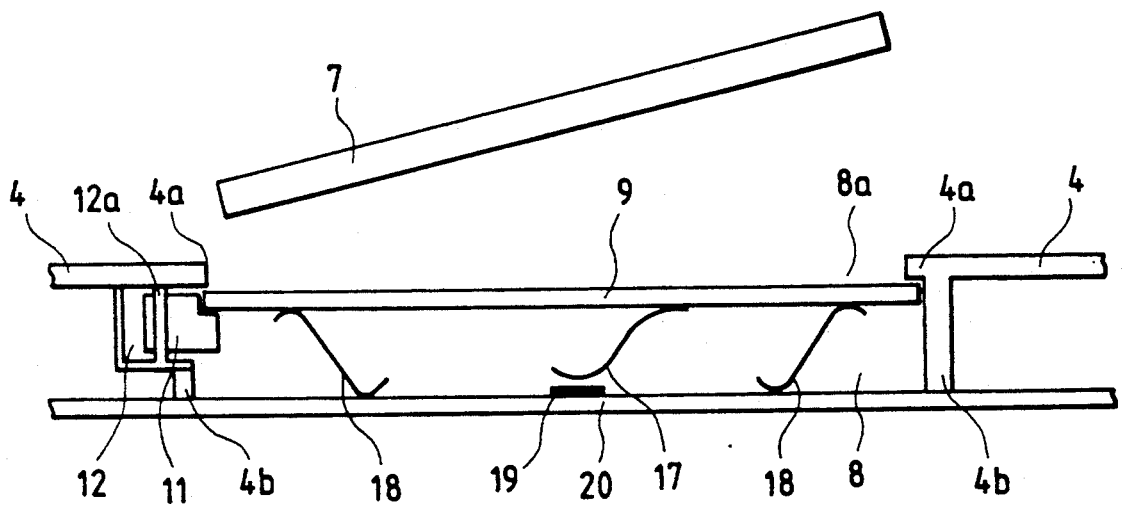
FIG. 19 is a view of the mounting portion shown in FIG. 18 from which a card has been removed.

Next, when the card 7 is removed as shown in FIG. 19, the flexible member (1) 17 is separated from the comb-tooth type pattern 19 on the PC board 20.

On the lower plane of the installation plate 9, the flexible member (1) 17 and flexible member (2) 18 are installed. The flexible member (2) 18 keeps pressing the installation plate 9 to the periphery 4a of the opening 8a. The flexible member (1) 17 is designed not to be in contact with the comb-tooth type pattern 19 on the PC board 20 when a card 7 is not loaded in the mounting portion 8. When a card 7 is loaded in the mounting portion 8, the flexible member (1) 17 touches the comb-tooth type pattern on the PC board 20, and then bends. A flexible member is used to compensate for dimensional variations and to support spring pressure of the flexible member (2) 18.

Figure 20:
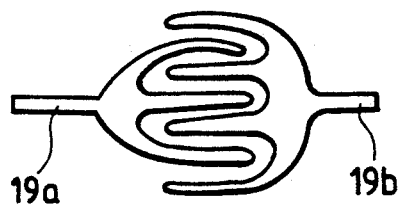
FIG. 20 shows a comb-tooth pattern of the mounting portion shown in FIGS. 18 and 19.

FIG. 20 shows an example of a comb-tooth type pattern. When the flexible member (1) 17 is in contact with the comb-tooth type pattern 19, patterns 19a and 19b be conductive. The comb-tooth type pattern is normally made of gold or carbon.

Figure 21:
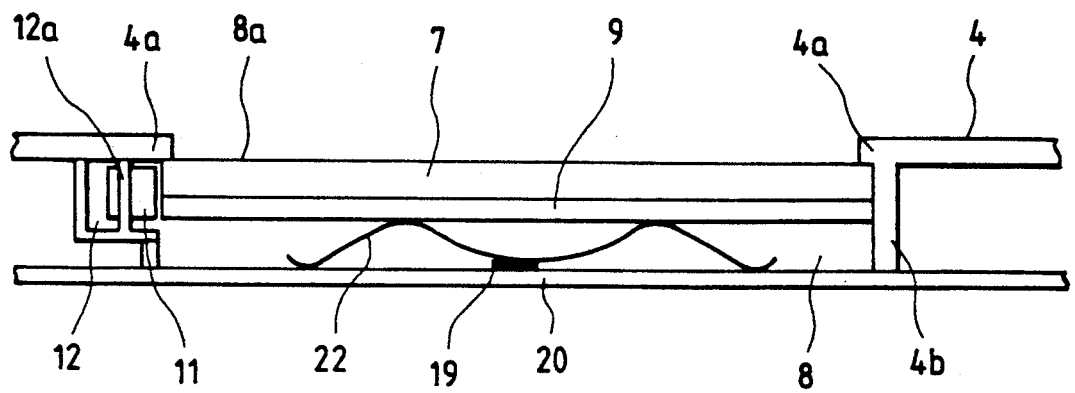
FIG. 21 is a detail drawing of a second modification of the mounting portion shown in FIG. 14.
Figure 22:
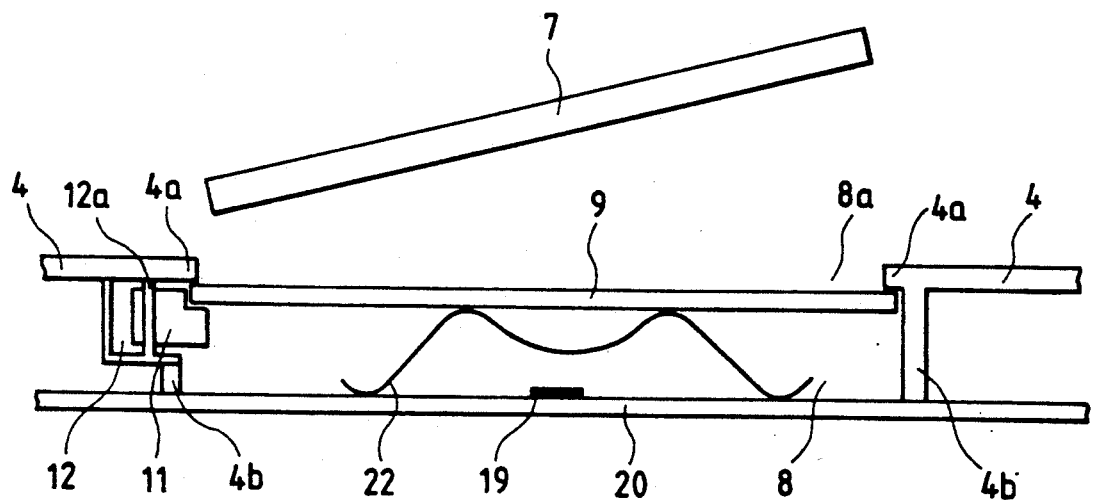
FIG. 22 is a view of the mounting portion shown in FIG. 21 from which a card has been removed.

In this embodiment, there are one flexible member (1) 17 and two flexible members (2) 18. There may be only one flexible member, as shown in FIGS. 21 and 22.

As mentioned previously, according to the third embodiment of the invention, a facsimile system comprises a card mounting portion which can load a data memory card having data input keys in such a way that the card will be freely detachable, a movable installation plate being installed in the mounting portion, a first pressing means which presses the installation plate toward an opening of the mounting portion to position the card vertically, a second pressing means for positioning the card laterally, and a detection means for detecting movement of the installation plate which is disposed in an interspace between the bottom of the mounting portion and the installation plate. Depending on the detection results of the detection means, it is identified whether a card is loaded. Even if a card is loaded in the mounting portion carelessly, the card can be brought into close contact with the installation plate. Thus, a light receiving unit and a light emitting unit are made in close contact with each other. This prevents creation of a gap between the light receiving unit and the light emitting unit, thus eliminating a data transfer failure due to insufficient light or incorrect data transfer due to incident external light. Thus, data can be transferred accurately. In addition, a facsimile system can be designed compact and made available for a low price.

The fourth embodiment of the invention is described below in conjunction with FIGS. 23 to 25. FIGS. 1, 2, 5, 6, and 8 showing the first embodiment are also used. The same components are assigned the same symbols or reference numerals, and their specific description is omitted.

Figure 23:
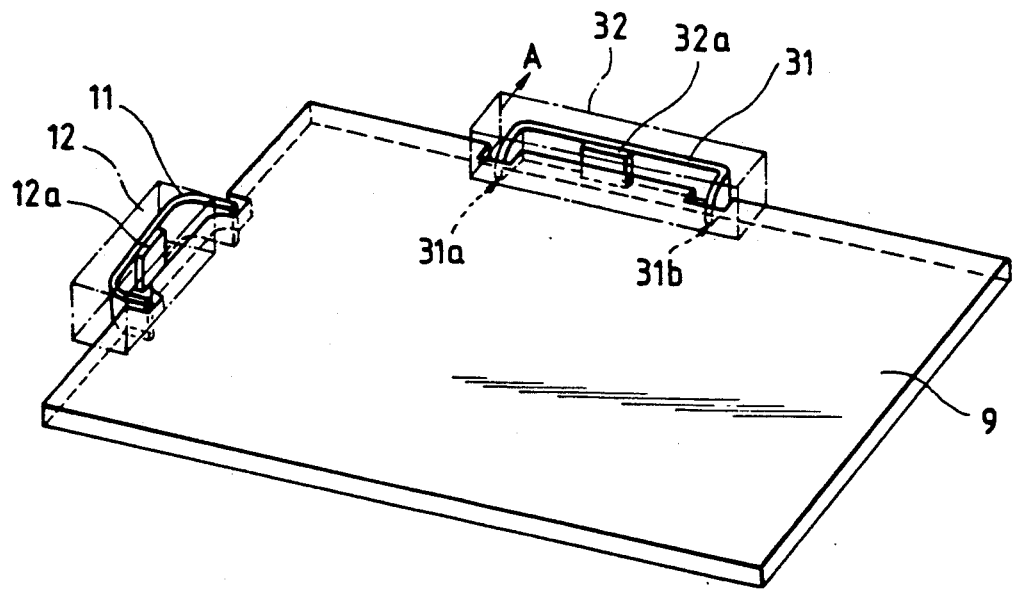
FIG. 23 shows the relation between the installation plate and the flat spring of a mounting portion shown in FIG. 1 which is associated with the fourth embodiment of the invention.
Figure 24:
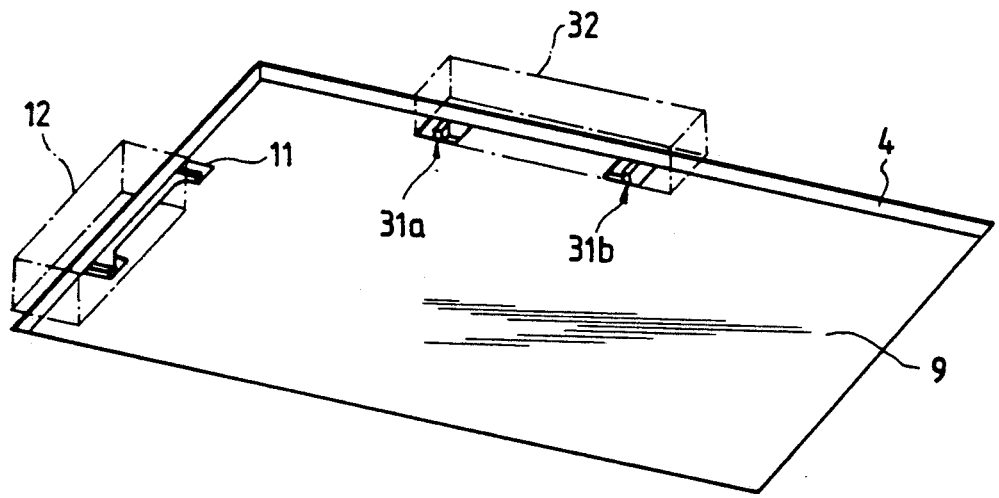
FIG. 24 is a perspective view of the mounting portion with the installation plate and the flat spring shown in FIG. 23 which is viewed from above.

A mounting portion 8 on the side of an installation plate 9 is provided with a plate spring 11 or a second pressing member as shown in FIGS. 23 and 24. The plate spring 11 is provided in the plate spring 11 storage chamber 12 in the mounting portion 8 and attached to an attachment member 12a in the chamber 12.

With the plate spring 11 or the second pressing member, a card 7 is positioned laterally. A plate spring 31 or a third member is allocated in orthogonal direction of the plate spring 11 or the second pressing member on the same plane.

The plate spring 31 is partly attached to an attachment member 32a in the storage chamber 32 as mentioned previously. When a force in A-arrow direction is applied to both ends 31a and 31b, reaction occurs.

The plate springs 11 and 31 are made of metallic spring material, or polyacetal resin (POM) or other plastic. If the springs are made of metal, in particular, areas contacting a card (for example, 31a and 31b) should be rounded or structured to be brought into contact with a plane of the card. This is intended to protect cards. Alternatively, the spring tip only may be covered with well-slidable plastic.

The plate springs 11 and 31 will not become a load for vertical movements of the installation plate 9, because they are constituted not to in contact a notch of the installation plate 9.

When a card 7 is loaded, the rim of the card is in contact with the pressing members 11 and 31. As a result, an intended pressure is generated.

Figure 25:
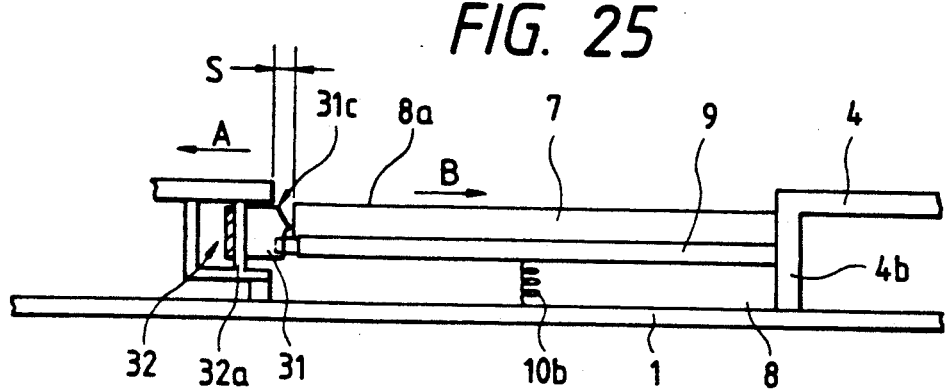
FIG. 25 is a lateral view of the mounting portion shown in FIG. 24.
Figure 26:
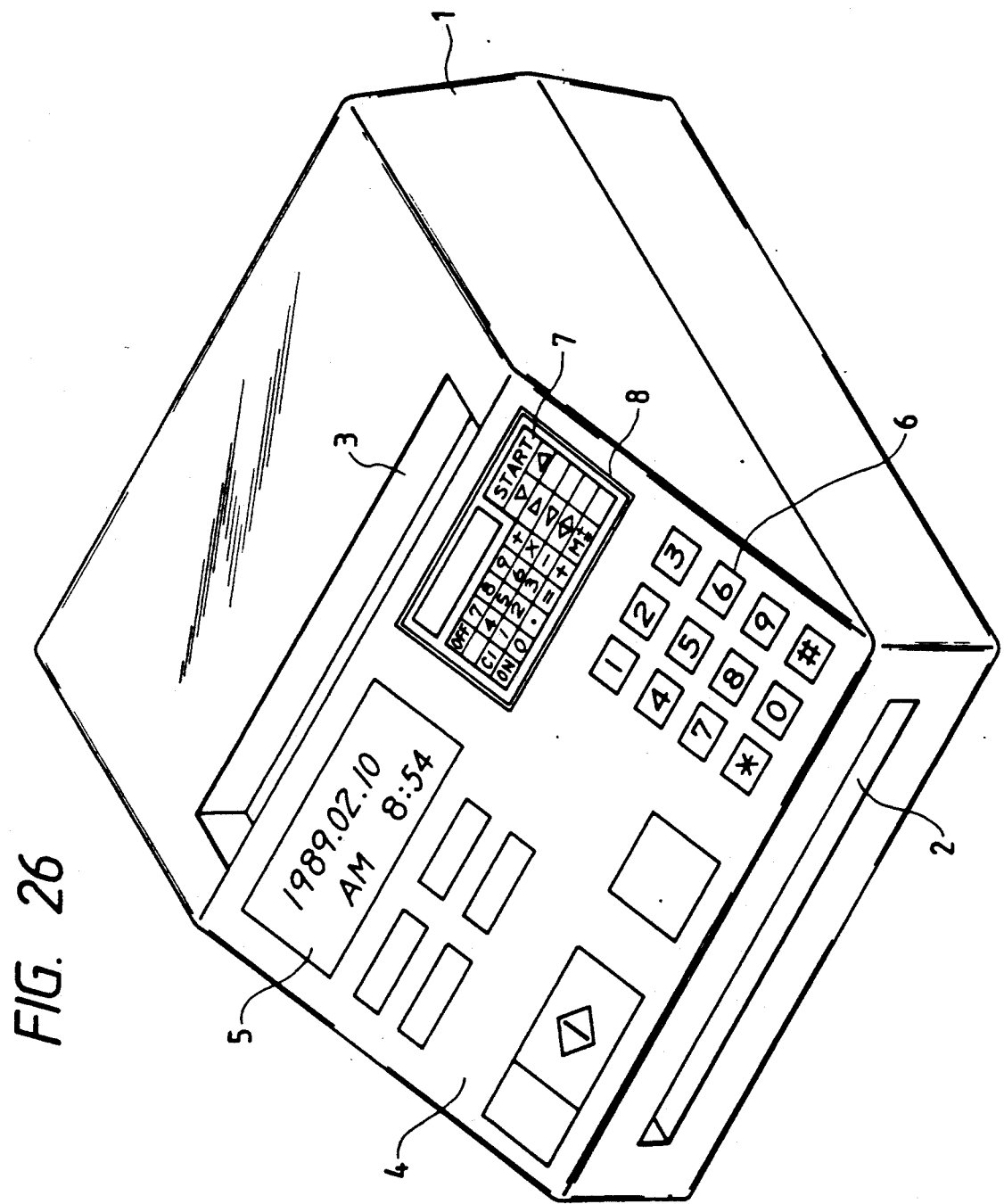
FIG. 26 is a sketch drawing of an entire system implementing a fifth embodiment of the invention.
Figure 27:
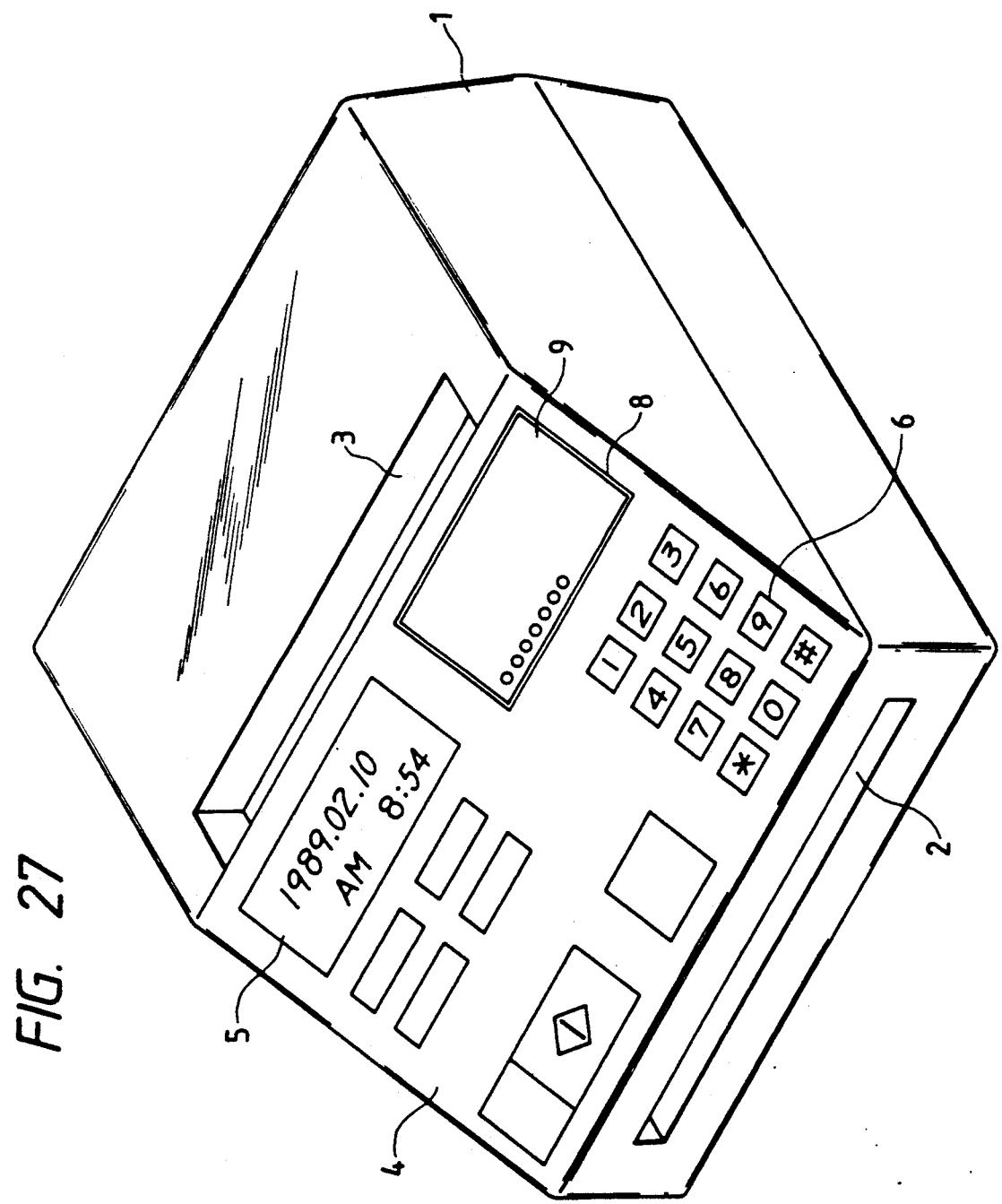
FIG. 27 is a view of the system shown in FIG. 26 from which a card has been removed.
Figure 28:
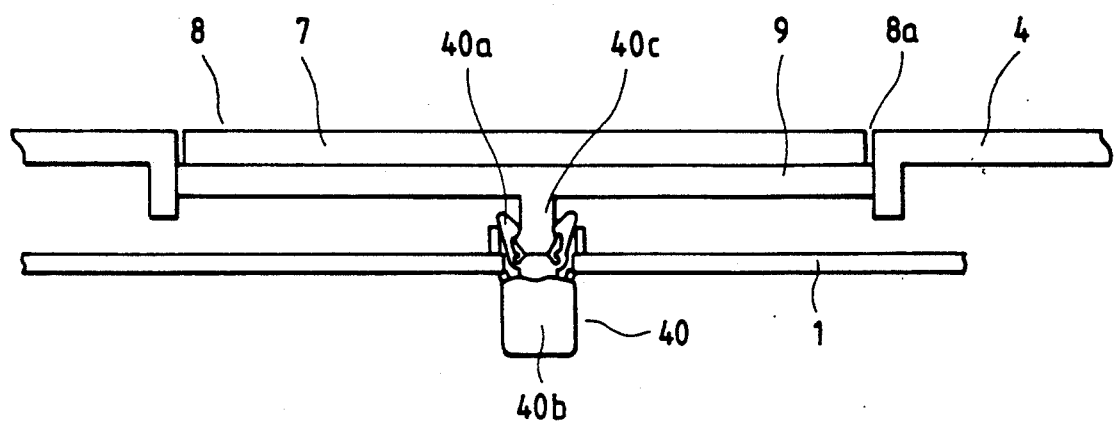
FIG. 28 is a detail drawing of the loader shown in FIG. 26.

A plate spring 31 or a third pressing member is pressed in A-arrow direction as shown in FIG. 25. The reaction causes card 7 to move B-arrow direction. One end of the card 7 contacts a side wall 4b of the mounting portion 8.

A section 31c of the plate spring 31 is tapered. When a card 7 is loaded from above, it is guided by the tapered section and placed on the installation plate 9. That is to say, when an attempt is made to load a card 7 against the plate spring 11, it is very difficult to move the flat spring 31 in orthogonal direction. To simplify this operation, this embodiment realizes a configuration which permits smooth loading without being bothered about the plate spring 31.

A tolerance between the opening 8a and the card 7 helps loading the card smoothly.

Next, the operation of the facsimile system having the aforesaid configuration are described.

A card 7 is held in such a way that LED windows $7_{s1}$ to $7_{s7}$ on the back of the card 7 will coincide with light receiving elements $N_1$ to $N_7$ in the system. Then, the card 7 is inclined. With one end of the card 7, the installation plate 9 is pressed against force of springs 10a and 10b through the opening 8a of the mounting portion 8. When one end of the card 7 is clamped between the periphery 4a of the opening 8a and the installation plate 9, the plate spring 11 or the second pressing member is pressed. With another end of the card 7, the installation plate 9 is pressed against force of the springs 10a and 10b. Then, another end of the card 7 is clamped between the periphery 4a of the opening 8a and the installation plate 9. When the card 7 is released, it is aligned to the side wall 4b by the plate spring or the second pressing member, and aligned to the side wall 4c by a third pressing member. Due to force of the coil springs 10a and 10b or a first pressing member, the card 7 is pressed by the installation plate 9 and eventually clamped between the installation plate 9 and the periphery 4a of the opening 8a.

Thus, the card 7 is positioned vertically by the coil springs 10a and 10b or the first pressing member, and laterally by the plate spring 11 or the second pressing member. The card 7 is also positioned back and forth by the third pressing member. As a result, light emitting diodes $L_1$ to $L_7$ and light receiving elements $N_1$ to $N_7$ are correctly positioned one another, enabling correct communication.

Keys $7_2$ on a card 7 are visible to an operator through the opening 8a. The operator presses intended keys $7_2$ on the card 7. with his/her finger. Then, information specified with the keys $7_2$ on the card 7 is sent as optical information from light emitting diodes $L_1$ to $L_7$ to light receiving elements in the main unit of the facsimile system.

To remove the card 7 from the mounting portion 8, the card 7 is pressed against force of springs 10a and 10b, and the plate spring 11 is also pressed. Thus, another end of the card 7 is released from clamp between the periphery 4a of the opening 8a and the installation plate 9. Then, one end of the card 7 is released from clamp between the periphery 4a of the opening 8a and the installation plate 9. Thus, the card is removed from the mounting portion 8.

As mentioned previously, according to the fourth embodiment of the invention, a facsimile system comprises a card mounting portion in which a data memory card having data input keys is loaded in such a way that the card will be freely detachable, a movable installation plate being provided in the loader, a first pressing means which presses the installation plate toward an opening of the mounting portion to align the card, a second pressing means for aligning the card in a first direction parallel with the bottom of the mounting, portion and a third pressing means for aligning the card in a direction which is orthogonal to the first direction and parallel with the bottom of the mounting portion. Therefore, even if a card is loaded in the mounting portion carelessly, the card can be brought into in close contact to the installation plate. Then, a light receiving unit and a light emitting unit can be made in contact with each other in all directions of X, Y, and Z. A tolerance is created between the light receiving unit and the light emitting unit. This eliminates a data transfer failure due to insufficient light or incorrect data transfer due to incident external light. Thus, data can be transferred accurately.

Figure 8:
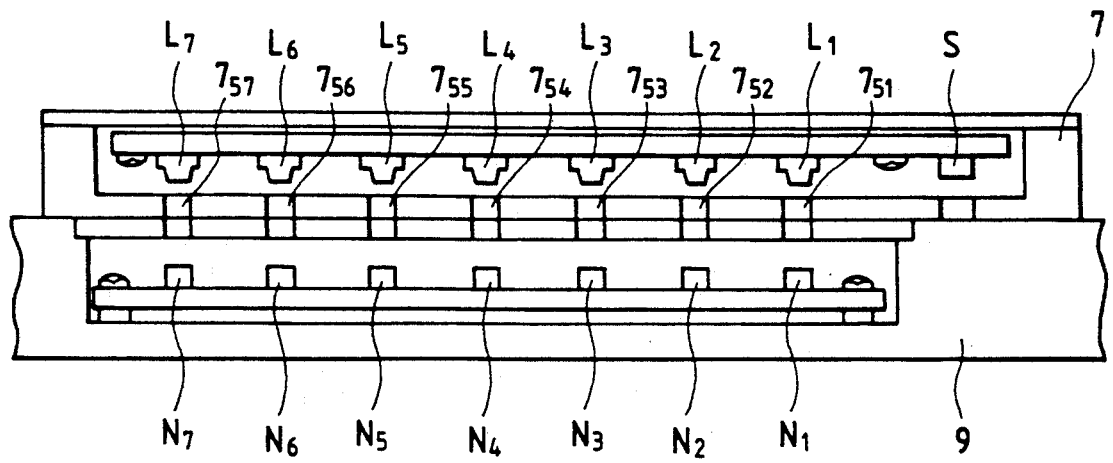
FIG. 8 is a detail drawing of the card and the installation plate shown in FIG. 7.

The fifth embodiment of the invention is described below in conjunction with FIGS. 26 to 30. FIGS. 5, 6, and 8 showing the first embodiment are also used. The same components are assigned the same symbols and reference numerals, and their specific description is omitted.

A card mounting portion 8 has an opening 8a for detaching a data memory card 7 or for operating keys on the card 7 externally. When a card 7 is loaded, the surface of the card 7 is substantially on the same plane as the surface of an operator panel 4. When a card 7 is not loaded, the surface of an installation plate 9 is substantially on the same plane as the surface of the operator panel 4. That is to say, the installation plate on which a card 7 is placed is provided in the mounting portion 8 so that it may be freely movable. The installation plate 9 can be moved to positions shown in FIGS. 28 and 29 by means of a push lock 40 or a position control member. The push lock 40 consists of a main unit 40b having a latch 40a and a striker 40c contacting the latch 40a. The push lock 40 has two stop positions such as, an open position indicated with (a) in FIG. 30 and a lock position indicated with (b). The movement from the open position to the lock position is performed when the latch 40a is pressed by the striker 40c. The return from the lock position to open position is performed when the latch 40a is further pressed by the striker 40c and an overstroke position is attained. The striker 40c is attached to the installation plate 9, and the push lock main unit 40b is fixed to the main unit 1 of a facsimile system.

Figure 29:
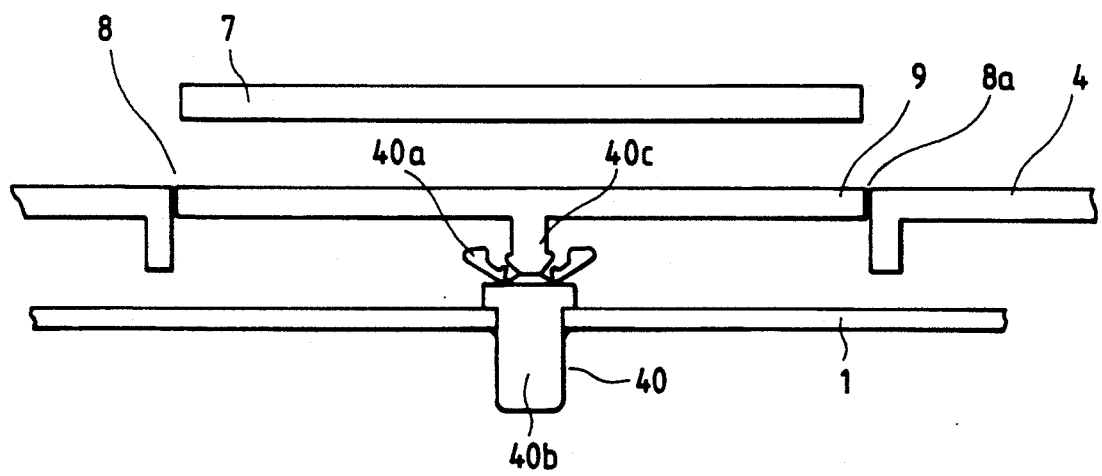
FIG. 29 is a detail drawing of the mounting portion shown in FIG. 27.

Next, the operation of the facsimile system having the above configuration is described. Initially, the surface of an installation plate 9 is substantially on the same plane as the surface of an operator panel as shown in FIG. 29. Therefore, a recess is not present in the mounting portion 8. This prevents dust from accumulating and thereof provides a fine appearance. At this time, the push lock 40 is at an open position indicated with (a) in FIG. 30. In this state, the card 7 is held in such a way that LED windows $7_{51}$ to $7_{57}$ on the back of the card 7 will coincide with light emitting elements $N_1$ to $N_7$ in the system. With the card 7, the installation plate 9 shielding the opening 8a of the mounting portion 8 is pressed against internal pressure of the push lock 40. Then, the push lock 40 moves from the open position to a lock position. Then, the installation plate 9 enters a state shown in FIG. 28. The surface of the card 7 is substantially on the same plane as the surface of the operator panel 4. Thereby, the card 7 is loaded into the mounting portion 8. Keys $7_2$ on the card 7 are visible in the mounting portion 8 to an operator. The operator presses intended keys $7_2$ on the card 7. Thereby, information specified with the keys $7_2$ on the card 7 is sent as optical information from light emitting diodes $L_1$ a to $L_7$ to light receiving elements $N_1$ to $N_7$ in the main unit of the facsimile system. At this time, no dust is accumulated in the mounting portion 8. Therefore, the light receiving unit consisting of light receiving elements $N_1$ to $N_7$ will not intervened with dust. Thus, correct communication can be performed.

To remove a card 7 from the mounting portion 8, the card 7 is pressed against internal pressure of the push lock 40. Then, the push lock 40 moves from the lock position through overstroke position to open position. Therefore, the installation plate 9 moves to a position at which the surface of the installation plate 9 is on the same plane as the surface of the operator panel 4 as shown in FIG. 29. Thus, the card 7 is removed.

As mentioned previously, according to the fifth embodiment of the invention, a facsimile system comprises a card mounting portion which can load a data memory card having data input keys in such a way that the card is detachable is provided on an operator panel, a movable installation plate being provided inside the mounting portion, and a position control member for controlling the movable position of the installation plate at least in two steps which is installed on the installation plate. With position control by the position control member, when the card is not loaded in the mounting portion, the installation plate is substantially on the same plane as the operator panel surface. When the card is loaded in the mounting portion, the card is substantially on the same plane as the operator panel surface. The appearance of the facsimile system or other data input/output apparatus will not vary depending on whether a card is loaded. This permits a fine external design. Moreover, since no recess is formed in the mounting portion, dust will not accumulate in a recess. This helps improve precision in data communication between a card and the main unit of a facsimile system. A fine appearance can also be obtained.

The sixth embodiment of the invention is described below in conjunction with FIGS. 31 to 36. FIGS. 5, 6, and 8 showing the first embodiment are also used. The same components are assigned the same symbols and reference numerals, and their specific description is omitted.

Figure 31:
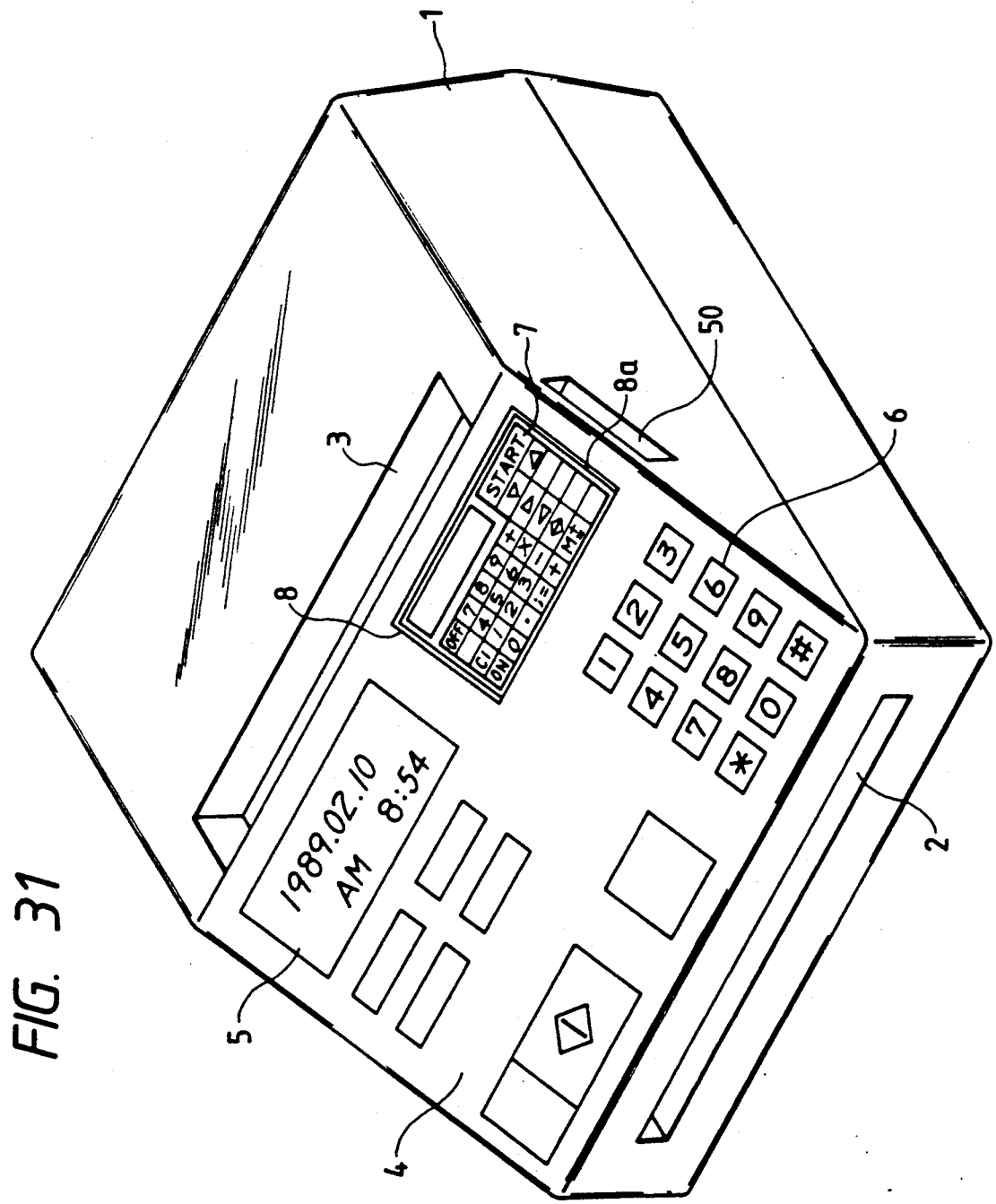
FIG. 31 is a sketch drawing of an entire system implementing a sixth embodiment of the invention.
Figure 32:
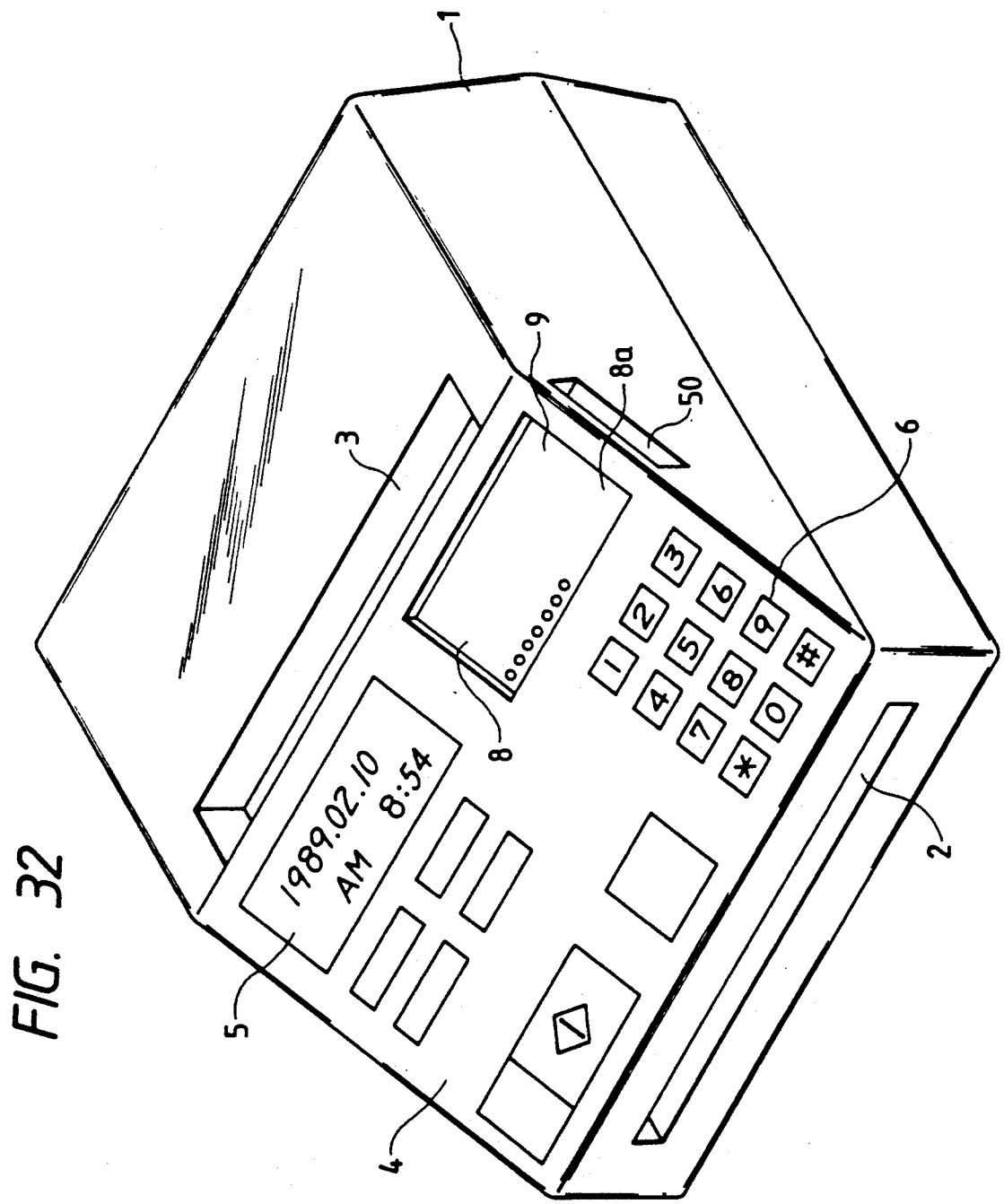
FIG. 32 is a view of the system shown in FIG. 31 from which a card has been removed.
Figure 33:
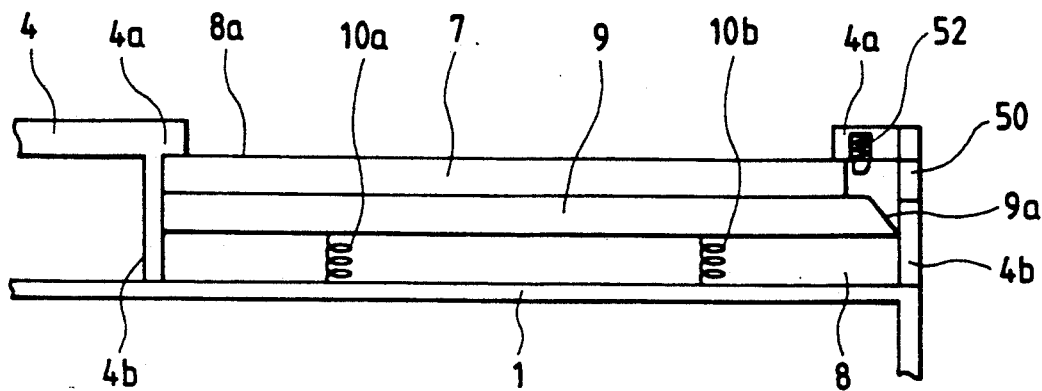
FIG. 33 is a detail drawing of the mounting portion shown in FIG. 31.
Figure 34:
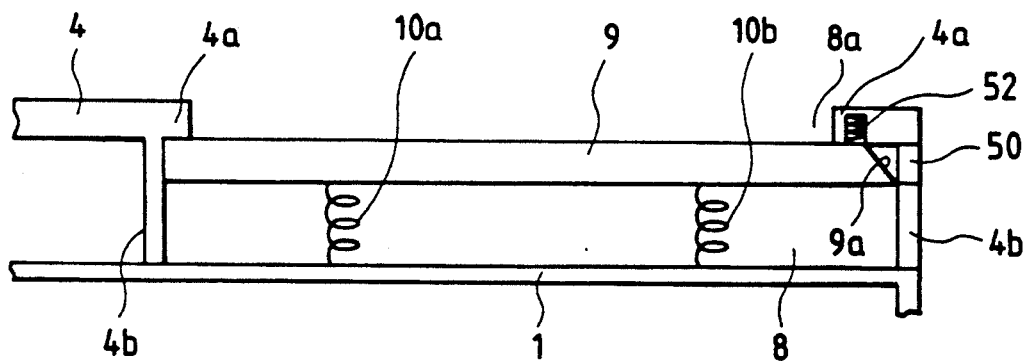
FIG. 34 is a detail drawing of the mounting portion shown in FIG. 32.
Figure 35:
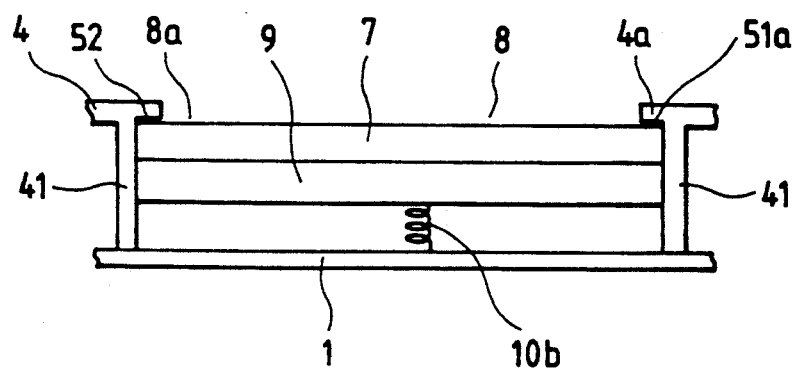
FIG. 35 is a lateral view of the mounting portion shown in FIG. 33 viewed from another side.
Figure 36A:
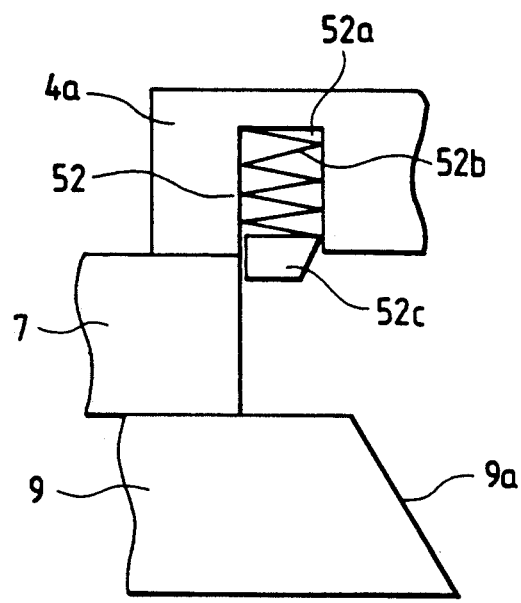
FIG. 36A shows a click unit of the mounting portion shown in FIG. 33.

A card mounting portion 8 includes an opening 8a for detaching a data memory card 7 or operating keys on the card 7 externally as shown in FIGS. 31 and 32. The mounting portion 8 has a concave shape. The mounting portion 8 is leading to a card slot 50 installed on the side of a main unit 1. The opening 8a is designed to be slightly smaller than the card 7, working to lock the card. In the mounting portion 8, an installation plate 9 on which a card 7 is place is installed to be freely movable. The installation plate 9 is pressed to the periphery 4a of the opening 8a by coil springs 10a and 10b or a pressing member as shown in FIGS. 33 and 34. When a card 7 is loaded, the card 7 is pressed by the springs 10a and 10b to thereof be clamped between the installation plate 9 and the periphery 4a of the opening 8a. 4b is a side wall on the circumference of the mounting portion 8. On the internal plane of an area leading from the slot 50 to the mounting portion 8, guides 51a and 51b are provided to help insert a card as shown in FIG. 35. Most portions of the guides 51a and 51b form a periphery 4a of the opening 8a. The thickness of the installation plate 9 is greater than the width of the slot 50. The end of the slot 50 on the installation plate 9 forms a tapered section 9a, helping insert a card 7. On the internal plane of the periphery 4 aaround the slot 50, a click 52 is attached. The click 52 consists of a spring 52b attached in a hole 52a and a stopping member 52c fixed to the spring 52b tip. The click 52 has a card locking function for a card loaded. FIG. 36A shows a state in which a card 7 is stopped, and FIG. 36B, a state before a card 7 is inserted. The stopper 52c of the click 52 is tapered so that the section on the side of the slot 50 can allow a card to be inserted smoothly.

Next, the operation of the aforesaid configuration is described. A card 7 is held in such a way that LED windows $7_{51}$ to $7_{57}$ on the back of the card 7 will be opposed to light receiving elements $N_1$ to $N_7$ in the system. One end of the card is inserted into the slot 50. When one end of the card 7 is brought in contact with a tapered section 9a of an installation plate 9, and then the card 7 is further pushed in, the installation plate 9 is pushed down against force of springs 10a and 10b according to the pushing force of the card 7. The periphery 4a of the opening 8a in the mounting portion 8 and the installation plate 9 is gradually spaced. When the space exceeds the thickness of the card 7, one end of the card 7 is pushed in through the space. When a space is created, a stopping member 52c of a click 52 is popping out from a hole 52a. When the card 7 is pushed in, the stopping member 52c is withdrawn due to its tapered shape. When one end of the card 7 reaches a side wall, since the installation plate is pressed by spring pressure of coil springs 10a and 10b as shown in FIG. 33, the card 7 is clamped between the installation plate 9 and the periphery of the opening 8a. At this time, the stopping member 52c of the click 52 pops out from the hole 52a and stops the card 7. When the card 7 is loaded in the loader 8 in this way, light emitting diodes $L_1$ to $L_7$ and light receiving elements $N_1$ to $N_7$ are correctly positioned one another, enabling correct communication.

Keys $7_2$ on a card 7 are visible to an operator via an opening 8a. The operator presses intended keys $7_2$ on the card 7 with his/her finger. Thereby, information specified with the keys $T_2$ on the card 7 is sent as optical information from light emitting diodes $L_1$ to $L_7$ to light receiving elements $N_1$ to $N_7$ in the system.

Figure 36B:
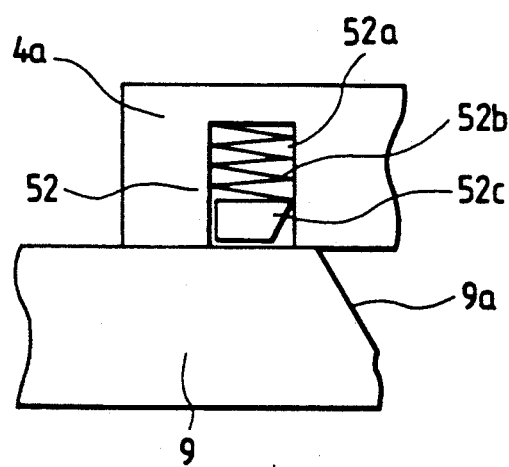
FIG. 36B shows the click unit in FIG. 36B when a card has been removed.

To remove the card 7 from the mounting portion 8 the card 7 is pressed against force of springs 10a and 10b so as to widen a space between the periphery 4a of the opening 8a and the installation plate 9. Then, another end of the card is released from the stopping member 52c of the click 52. The card 7 is slided so that another end of the card 7 will be guided to the slot 50. Then, the card 7 comes out of the slot 50, and then can be removed from the mounting portion 8. At this time, the stopping member 52c of the click 52 attempts to pop out. However, since the installation plate 9 is pressed by coil springs 10a and 10b and contacting the periphery 4b of the opening 8a, the stopping member 52c is pressed as shown in FIGS. 34 and 36B, and then positioned within the hole 52a. Thus, the stopping member 52c returns to the initial state.

As mentioned previously, according to the sixth embodiment of the invention, a facsimile system comprises a card mounting portion in which a data memory card acting as an electronic telephone directory can be loaded in such a way that the card may be freely detachable from a card slot installed on the side wall of the main unit, a movable installation plate being provided in the mounting portion, guide members for inserting the card which is attached on the internal plane of the mounting portion, and a pressing means for pressing the installation plate to the guide members. When a card is loaded in the mounting portion, the card is clamped between the guide members of the mounting portion and the installation plate. Therefore, even if a card is inserted through the slot carelessly, the card can be brought into close contact with the installation plate. This prevents creation of a gap between a light receiving unit and a light emitting unit, thus eliminating a data transfer failure due to insufficient light or incorrect data transfer due to incident external light. Consequently, data can be transferred accurately.

The seventh embodiment of the invention is described below in conjunction with FIGS. 37 to 40. FIGS. 5, 6, and 8 showing the first embodiment are also used. The same components are assigned the same symbols and reference numerals, and their specific description is omitted.

Figure 37:
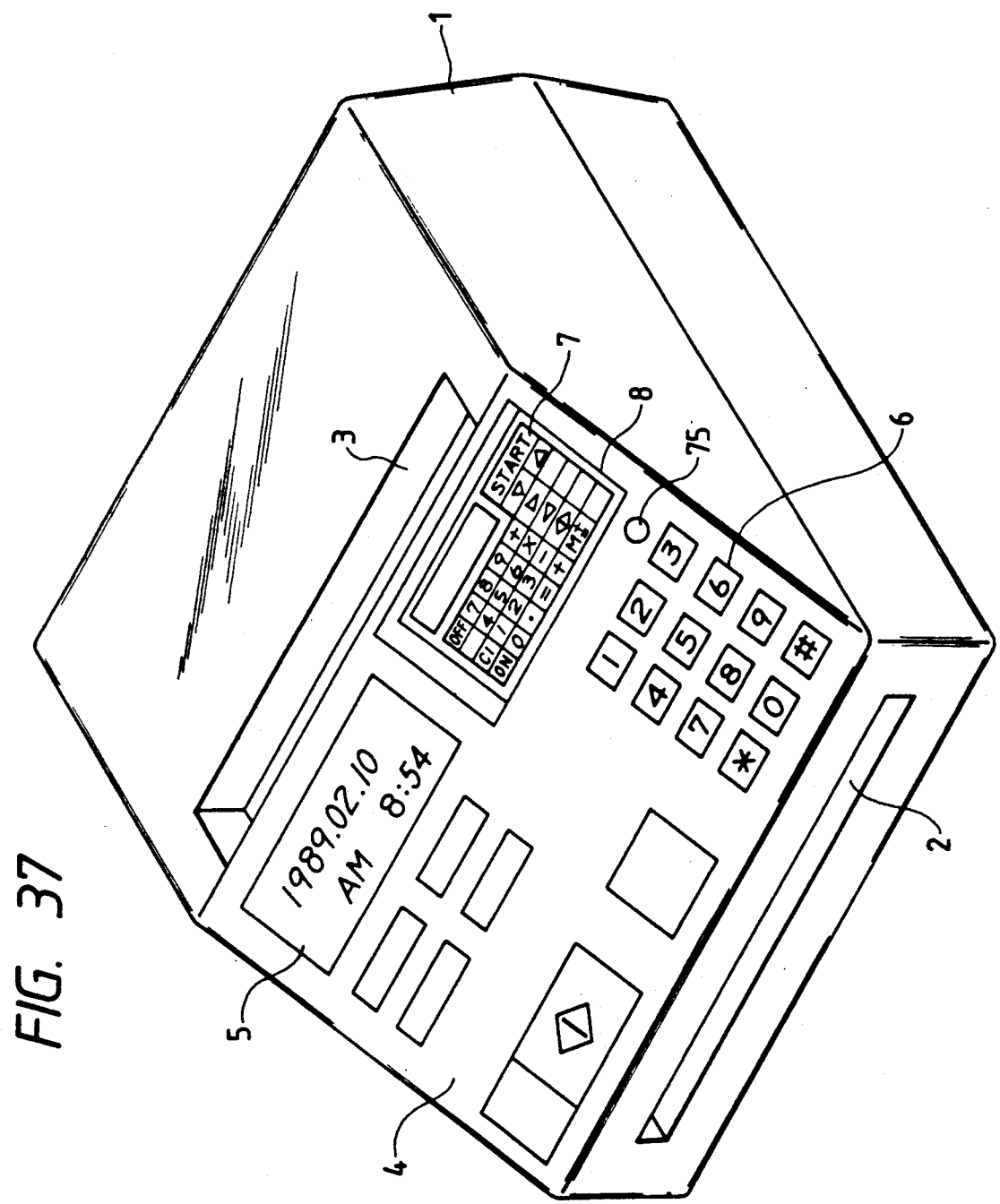
FIG. 37 is a sketch drawing of an entire system implementing a seventh embodiment of the invention.
Figure 38:
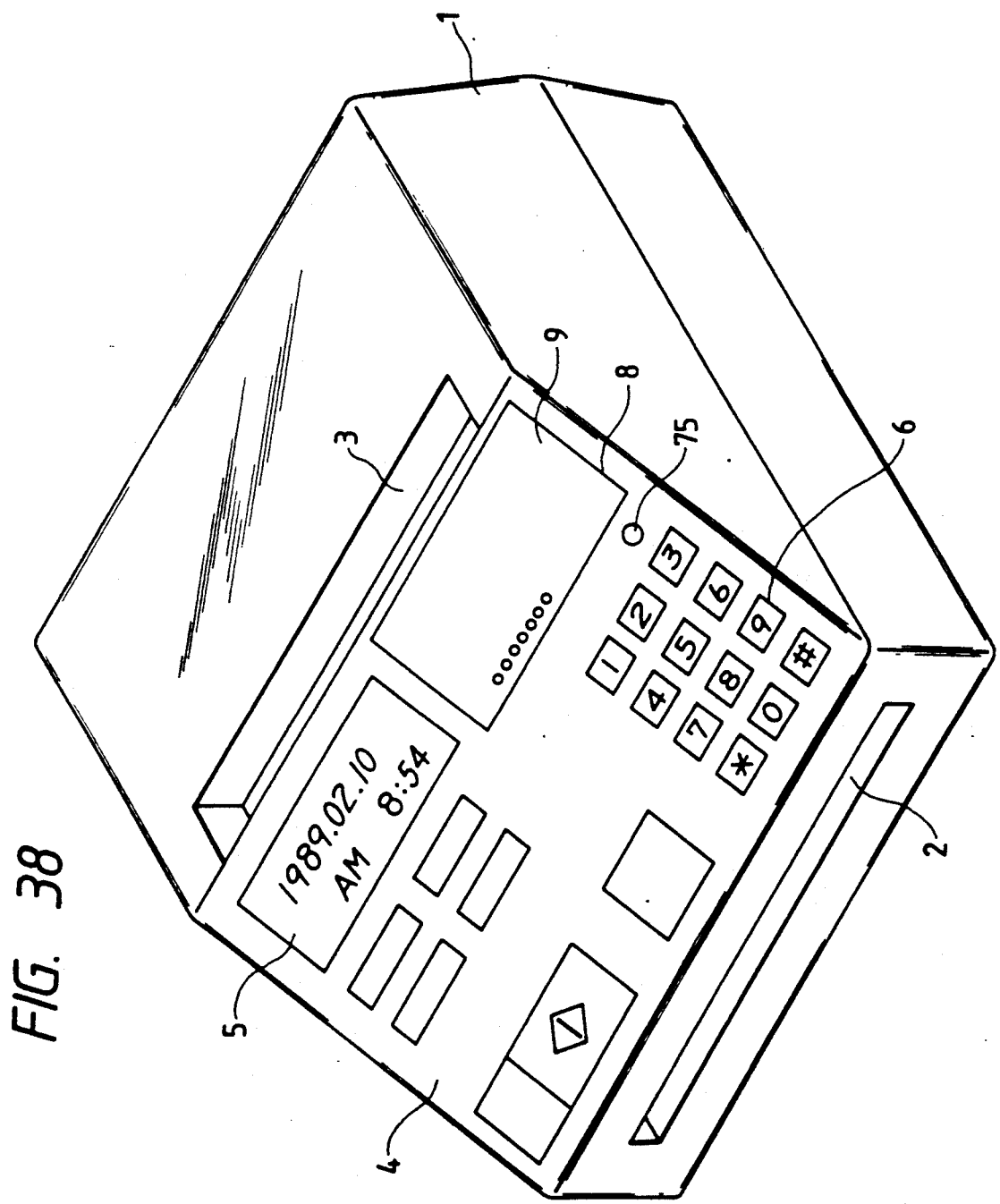
FIG. 38 is a view of the system shown in FIG. 37 from which a card has been removed.
Figure 39:
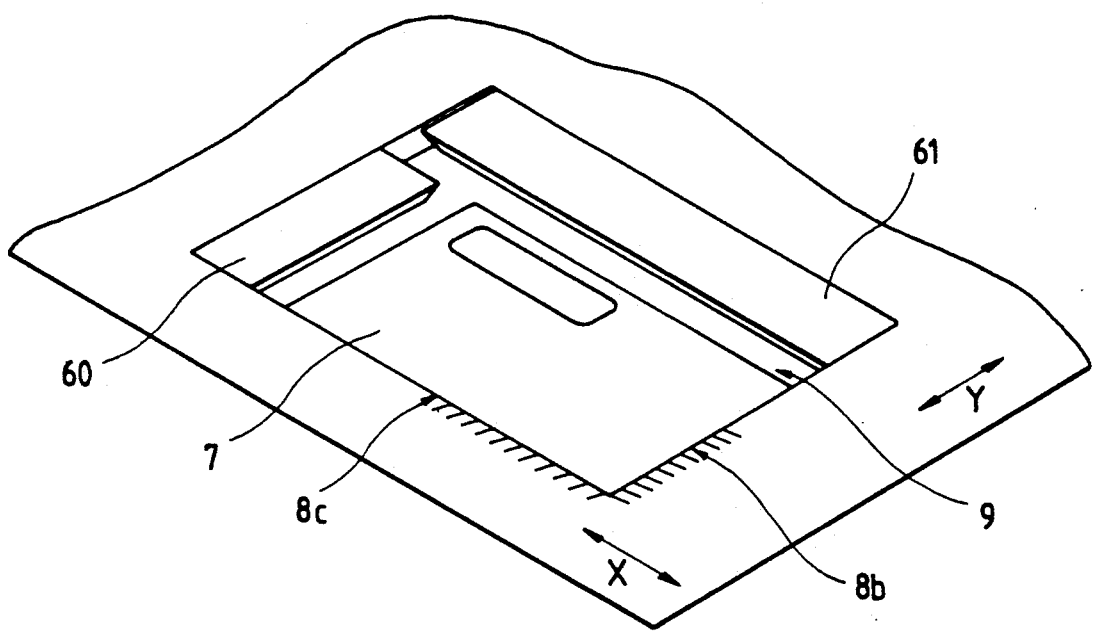
FIG. 39 is a perspective view of an initial state of the card mounting portion shown in FIG. 37.

FIGS. 37 and 38 show a facsimile system having an electronic telephone directory which includes a return button 75. A card mounting portion 8 is slighter larger than the external dimensions of a card 7 as shown in FIG. 39. A backlash is present in X and Y directions. Mutually orthogonal sides 8b and 8c of an opening are stationary and work as a reference position when a card contacts therewith. Members 60 and 61 constitute movable sides which are movable in X and Y directions respectively.

Figure 40A:
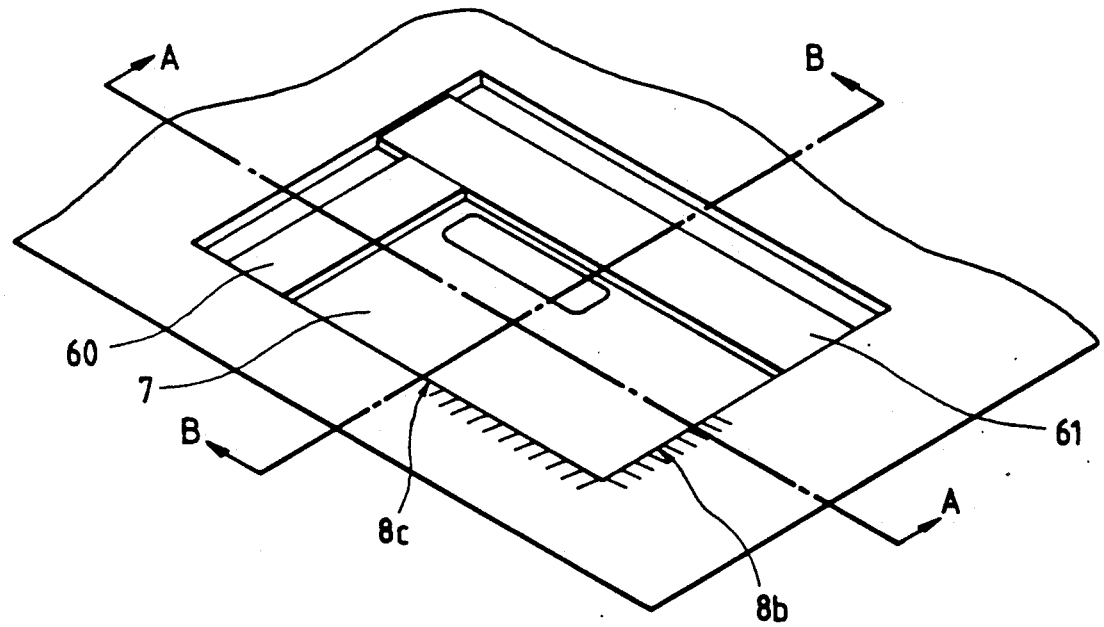
FIG. 40A is a perspective view of the card loaded state shown in FIG. 39.
Figure 40B:
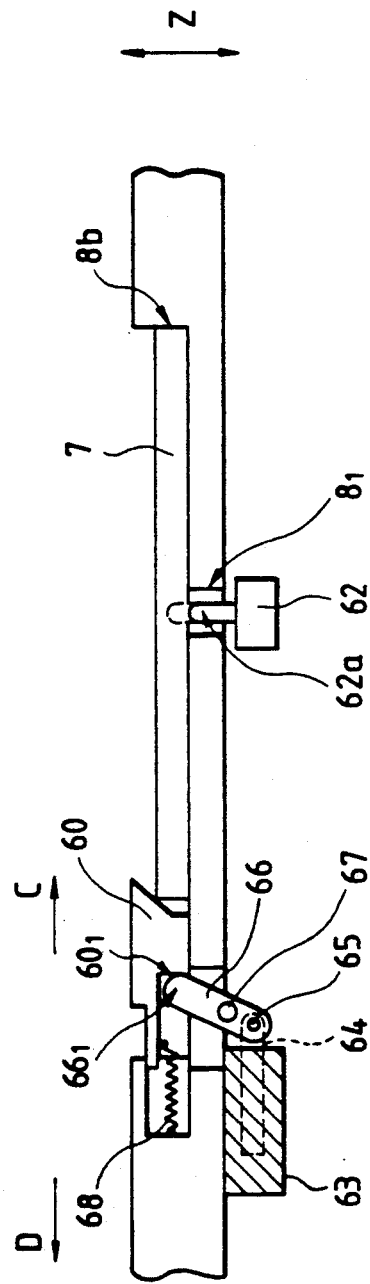
FIG. 40B is an A-A cross-sectional drawing of FIG. 40A.
Figure 40C:
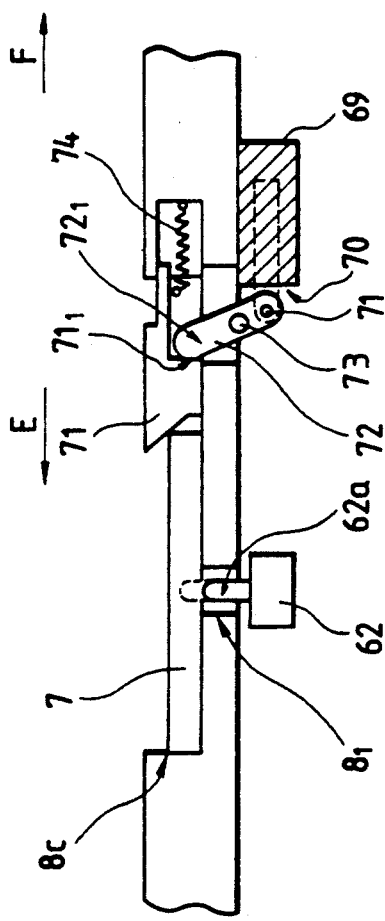
FIG. 40C is a B-B cross-sectional drawing of FIG. 40A.
Figure 41:
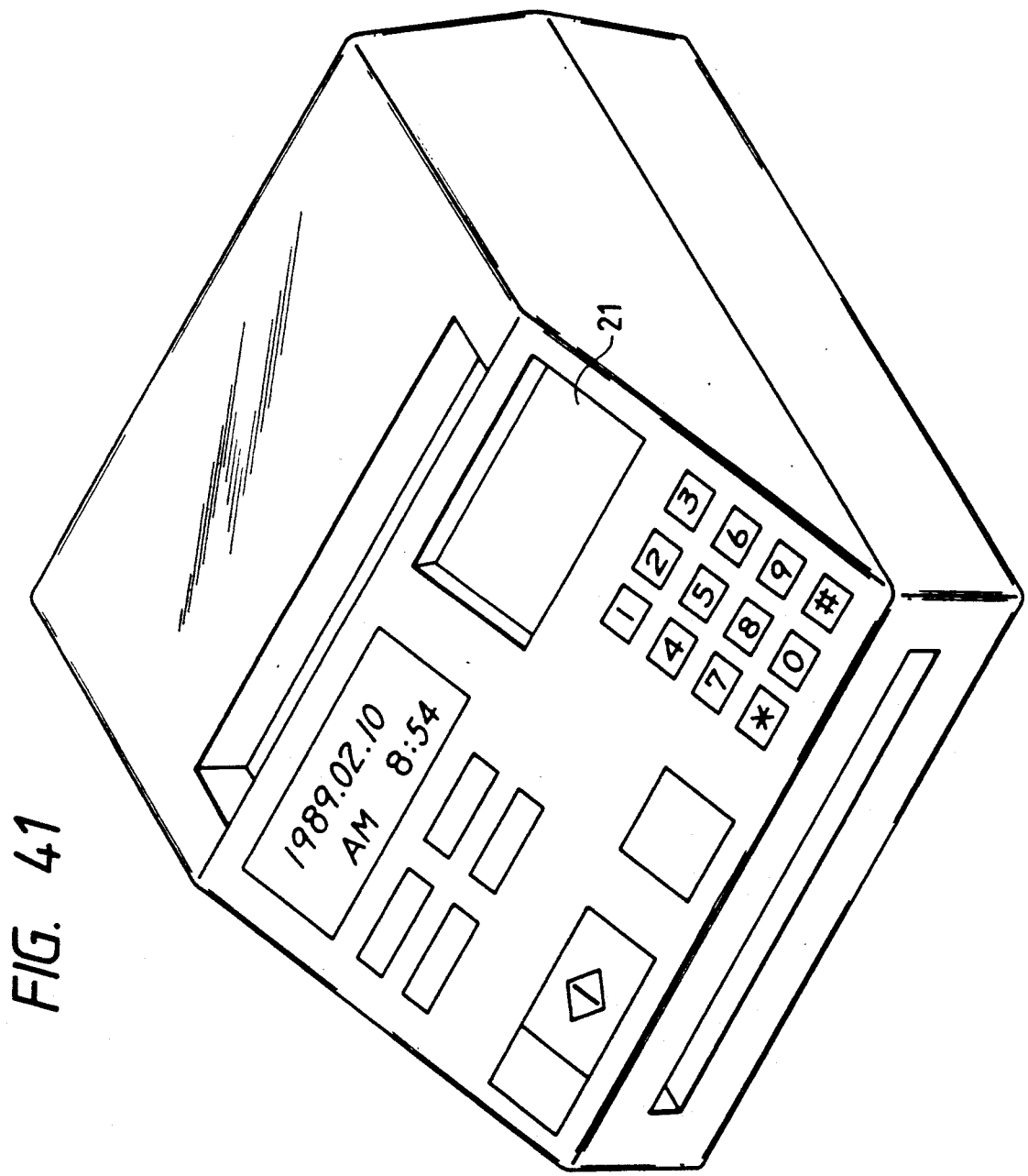
FIG. 41 shows a prior system.

FIG. 40A shows a state in which movable sides 60 and 61 are pressing a card toward a reference position. FIG. 40B is an A—A cross-directional drawing of FIG. 40A. FIG. 40C is a B—B cross-directional drawing of FIG. 40A.

Using FIGS. 40A, 40B, and 40C, the operations of loading a card and moving movable sides are described below.

In FIG. 40B, a hole $8_1$ is drilled on part of a card mounting portion 8. Under the hole $8_1$, a detection switch 62 such as a limit switch is attached to a main unit. Naturally, an actuator 62a is in the state indicated with a broken line, and the detection switch 62 is OFF. On the other hand, when a card 7 is placed on the mounting portion 8 as shown in FIG. 40A, the actuator is positioned as indicated with a continuous line and the detection switch 62 is ON. At this time, the detection switch 62 energizes a solenoid 63, causing an iron core to be pulled in D-arrow direction. A pin 65 is press-fitted into the iron core 63. The pin 65 is inserted into one end of a lever 66. The lever 66 is supported on a pin 67 attached to the main unit so that it will be freely rotatable. When the iron core 64 is pulled in D-arrow direction, the lever 67 rotates clockwise. Then, one end $66_1$ of the lever touching one portion $60_1$ of a movable strip 60 pushes the movable strip 60 in C-arrow direction.

In short, when the solenoid 63 is energized, the movable strip 60 pushes the card 7 in C-arrow direction and stops when the right end of the card hits a reference side 8b. 68 represents a tension spring sparined to the movable strip 60. When the solenoid 63 is deenergized, the tension spring 68 pulls the movable strip 60 in D-arrow direction and thereof returns it to the initial state.

In FIG. 40C, 69 is a solenoid, and 70, an iron core of the solenoid. 71 represents a pin which is attached to be freely rotatable. A lever 72 is supported by a pin 73. 74 is a return spring.

As mentioned previously, when a card 7 is placed on the mounting portion 8 and a detection switch 62 is set to ON, the solenoid 69 is energized and the lever 72 rotates counterclockwise. One end 72₁ of the lever 72 pushes one portion 61₁ of a movable strip 61 in E-arrow direction. As a result, the card 7 is pushed in E direction and stops when the lower end of the card 7 hits a reference side 8c. Thus, when a card 7 is placed on the mounting portion 8, the card 7 is automatically pressed toward preset reference sides 8b and 8c, and then stops.

The portions of the movable strips 60 and 61 which contact a card 7 are tilting as illustrated. When each of the movable strips 60 and 61 is pressed in C or E direction, a downward component force is generated as shown in FIG. 40C. Then, the card 7 is pushed to the bottom of the mounting portion 8. A special consideration is taken not to allow the card to float in Z direction. Therefore, planes for emitting and receiving light are adhered each other, increasing system reliability.

To remove movable strips to the initial states, a return button 75 on an operator panel is operated.

When the return button 75 is held down, energization of solenoids 63 and 69 is OFF. Owing to return springs 68 and 74, movable strips 60 and 61 are returned to their initial states and a card can ge removed.

In the aforesaid seventh embodiment, after the solenoide retain certain amounts of current, less current flows the solenoids. This helps save energy.

If the solenoids are energized when some time has elapsed after a card detection means detects a card (for example, one to three seconds), system operability can be improved.

The invention may apply to a system which communicates using electric signals instead of optical signals.

This embodiment relates to a facsimile system. However, the present invention may be applied to a telephone set or a computer which can communicate data via a telephone line.

As mentioned previously, according to the seventh embodiment of the invention, when it is detected that a card is placed, movable strips are moved so that the card will be pressured and positioned at a given location. Even if a card is placed carelessly, the card can be positioned at a given location precisely in X and Y directions. Thereby, a light receiving unit and a light emitting unit can be precisely positioned each other. This eliminates a data transfer failure due to insufficient light or incorrect data transfer due to incident external light. Thus, data can be transferred accurately.

We claim:

1. A facsimile system, comprising:
    a card mounting means for receiving a data memory card having data input keys and a transmission means which transmits data in such a way that the card may be freely detachable;
    said card mounting means having an opening so that said input keys on said card can be operated;
    a movable installation member which forms the bottom of the card mounting means;
    a receiving means for receiving signals sent from said transmission means; and
    said receiving means being installed on said movable installation member;
    a pressing means for pressing said movable installation member to the periphery of said opening in said card mounting means;
    said pressing means allowing said card to be clamped between the periphery of said opening in said card mounting means and said installation member when said card is loaded in said card mounting means.

2. A facsimile system according to claim 1, further comprising:
    other pressing means which presses said card in a first direction which is parallel with said installation member forming the bottom of said card mounting means, when said card is loaded on said card mounting means.

3. A facsimile system according to claim 1, further comprising:
    a detection means for detecting movements of said movable installation member, wherein said detection means uses the detection results to determine whether said receiving means should be set to a receiving state.

4. A facsimile system according to claim 2, further comprising:
    other pressing means which presses said card in a direction which is parallel with said movable installation member forming the bottom of said card mounting means and orthogonal to the first direction, when said card is loaded on the card mounting means.

5. A facsimile system according to claim 4; wherein each pressing means is a spring.

6. A facsimile system according to claim 1; wherein said card mounting means is provided with a card slot for detaching said card and installed on a side wall of the main unit.

7. A facsimile system, comprising:
    a card mounting means for receiving a data memory card having data input keys and a transmission means which transmits data in such a way that the card may be freely detachable;
    said card mounting means having an opening for operating said input keys on said card and detaching said card;
    a movable installation member forming the bottom of said card mounting means;
    a receiving means for receiving data sent from said transmission means; and
    said receiving means being installed in said movable installation member;
    a position control means which controls the movable position of said movable installation member in at least two steps;
    said position control means being moved to a first position at which said movable installation member is substantially on the same plane as the periphery of said opening of said card mounting means when said card is not loaded on said card mounting means, and to a second position at which said card surface is substantially on the same plane as the periphery of said opening of said card mounting means when said card is loaded on said card mounting means.

8. A facsimile system according to claim 7; wherein said control means is a push lock.

9. A facsimile system, comprising:
    a card mounting means for receiving a data memory card having data input keys and a transmission means for transmitting data in such a way that the card may be freely detachable;
    said card mounting means having an opening for operating said input keys on said card;
    a receiving means for receiving signals sent from said transmission means;

said receiving means being installed in said card mounting means;

a movable means which positions said card at a given location in said card mounting means; and said movable means positioning said card at a given location in said card mounting means so that said transmission means may coincide with said receiving means;

a detection means for detecting whether said card is loaded on said card mounting means;

said detection means actuating said movable means when having detected that said card is loaded on said card mounting means.

* * * * *

UNITED STATES PATENT AND TRADEMARK OFFICE
CERTIFICATE OF CORRECTION

PATENT NO. : 5,221,970

DATED : June 22, 1993

INVENTOR(S) : TAKAHIRO SAKAMOTO, ET AL

Page 1 of 3

It is certified that error appears in the above-indentified patent and that said Letters Patent is hereby corrected as shown below:

On the title page: Item [56] Reference Cited:

IN [56] REFERENCES CITED

Under U.S. PATENT DOCUMENTS:
"4,943,068  7/1990  Yoshinaga et al." should read
--4,943,868  7/1990  Yoshinaga et al.-- and
"5,115,273  9/1992  Ujiie et al." should read
--5,115,273  5/1992  Ujiie et al.--.

COLUMN 1

Line 18, "is tend" should read --tends--.

COLUMN 4

Line 36, "display $7_1$" should read --display $7_1$ and various--.

COLUMN 5

Line 9, "cated" should read --cated along--.

COLUMN 8

Line 22, "pressed" should read --presses--.

COLUMN 9

Line 1, "be" should read --are--.
Line 62, "in" should be deleted.

UNITED STATES PATENT AND TRADEMARK OFFICE
CERTIFICATE OF CORRECTION

PATENT NO. : 5,221,970
DATED : June 22, 1993
INVENTOR(S) : TAKAHIRO SAKAMOTO, ET AL It is certified that error appears in the above-indentified patent and that said Letters Patent is hereby corrected as shown below:

COLUMN 10

Line 21, "against" should read --against the--.
Line 44, "positioned" should read --positioned with--.

COLUMN 11

Line 3, "mounting," should read --mounting--.
Line 50, "panel" should read --panel 4--.

COLUMN 12

Line 2, "ato" should read --to--.
Line 7, "intervened" should read --intervene--.
Line 54, "place" should read --placed--.
Line 59, "to thereof" should read --thereof to--.

COLUMN 14

Line 22, "slighter" should read --slightly--.

COLUMN 15

Line 17, "adhered" should read --adhered to--.
Line 23, "ge" should read --be--.
Line 25, "oide retain" should read --oid retains--.
Line 26, "flows" should read --flows through--.
Line 45, "positioned" should read --positioned with--.

UNITED STATES PATENT AND TRADEMARK OFFICE
CERTIFICATE OF CORRECTION

PATENT NO. : 5,221,970

DATED : June 22, 1993

INVENTOR(S) : TAKAHIRO SAKAMOTO, ET AL

It is certified that error appears in the above-indentified patent and that said Letters Patent is hereby corrected as shown below:

Column 16, line 25, "claim 4," should read --claim 4,--.
         line 27, "claim 1," should read --claim 1, --.
         line 58, "claim 7;" should read --claim 7, --.

Signed and Sealed this

Twenty-second Day of March, 1994

Attest:

BRUCE LEHMAN

Attesting Officer      Commissioner of Patents and Trademarks